(12) United States Patent
Soejima et al.

(10) Patent No.: US 6,654,823 B2
(45) Date of Patent: Nov. 25, 2003

(54) PACKET-DATA PROCESSING APPARATUS

(75) Inventors: Satoshi Soejima, Suginami (JP); Yuji Kojima, Kawasaki (JP); Yasuyuki Umezaki, Fukuoka (JP); Tetsumei Tsuruoka, Kawasaki (JP); Yoshitomo Shimozono, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 417 days.

(21) Appl. No.: 09/818,354

(22) Filed: Mar. 27, 2001

(65) Prior Publication Data

US 2002/0019882 A1 Feb. 14, 2002

(30) Foreign Application Priority Data

Aug. 9, 2000 (JP) ........................................ 2000-240829

(51) Int. Cl.[7] ................................................ G06F 3/00
(52) U.S. Cl. ..................... 710/52; 709/250; 370/351
(58) Field of Search ................. 710/52, 1; 370/474, 370/351, 412; 709/249, 250

(56) References Cited

U.S. PATENT DOCUMENTS

| | | | |
|---|---|---|---|
| 4,480,307 A | * 10/1984 | Budde et al. | ................ 710/100 |
| 5,369,775 A | * 11/1994 | Yamasaki et al. | .............. 712/25 |
| 5,623,605 A | * 4/1997 | Keshav et al. | ............... 709/236 |
| 5,844,918 A | * 12/1998 | Kato | ........................... 714/751 |
| 6,452,920 B1 | * 9/2002 | Comstock | .................... 370/349 |
| 2002/0057669 A1 | * 5/2002 | Joung | .......................... 370/351 |

FOREIGN PATENT DOCUMENTS

| | | | |
|---|---|---|---|
| JP | 10-135985 | 5/1998 | |
| JP | 200-312228 | * 7/2000 | ............ H04I/12/56 |

* cited by examiner

*Primary Examiner*—Kim Huynh
(74) *Attorney, Agent, or Firm*—Katten Muchin Zavis Rosenman

(57) ABSTRACT

A packet-data-processing apparatus includes a first data-processing unit for computing information on a processing count; a memory; a second data-processing-unit for processing the input packet and storing first results in the memory; an access mechanism unit for reading out one of the first results written into the memory least recently from the memory at a request for a read operation and deleting the result of processing read out from the memory; a third data-processing unit for making the request for a read operation and carrying out processing based on the first result read out by the access control unit at the request and an input packet associated with the result of processing; and fourth data-processing unit constituting pipeline data-processing mechanism with the first and third data-processing unit.

5 Claims, 17 Drawing Sheets

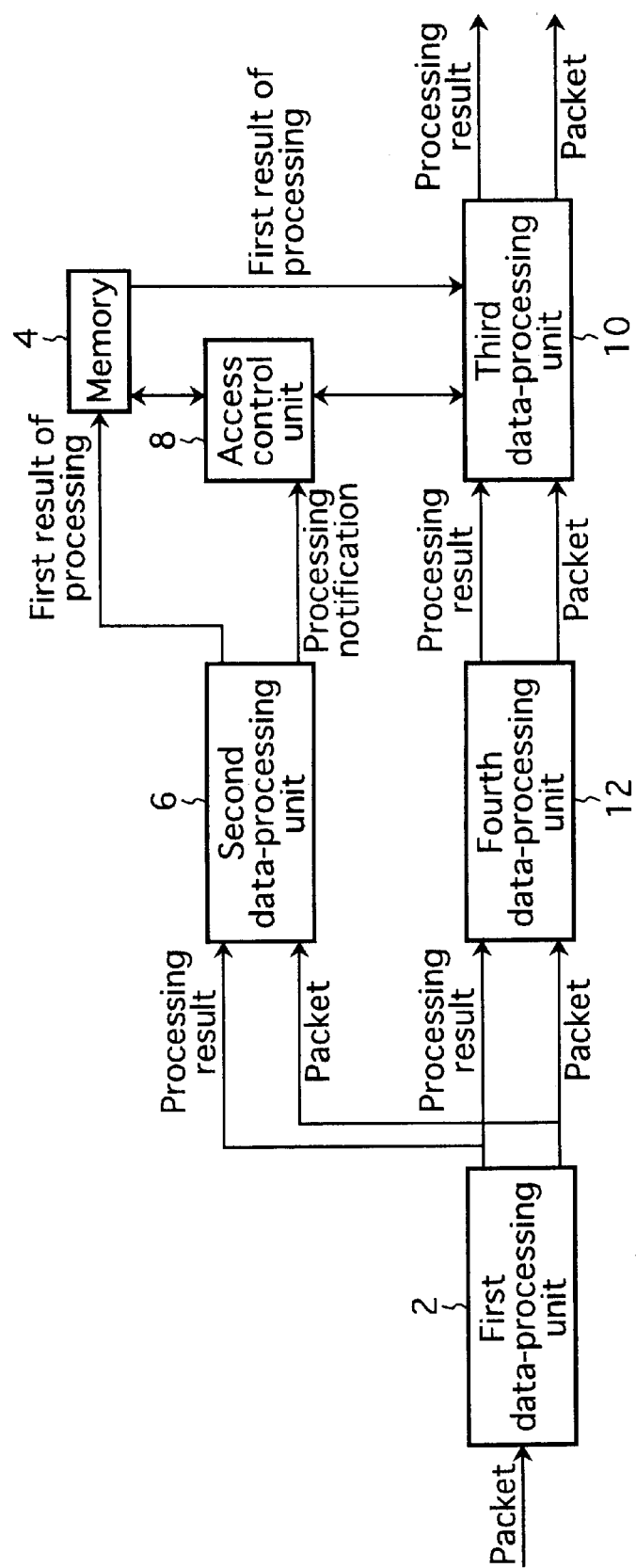
F I G. 1

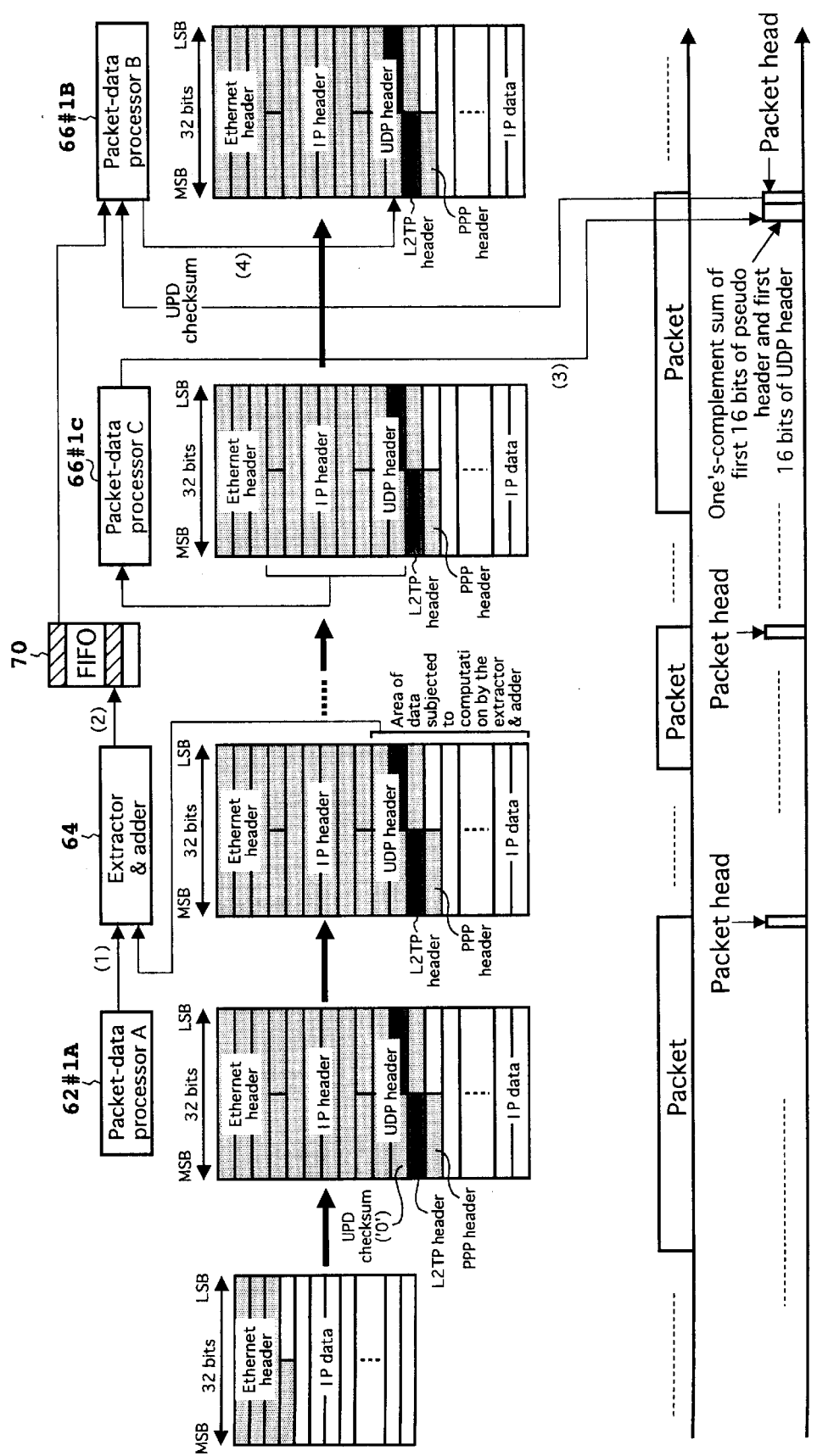
F I G. 1 2

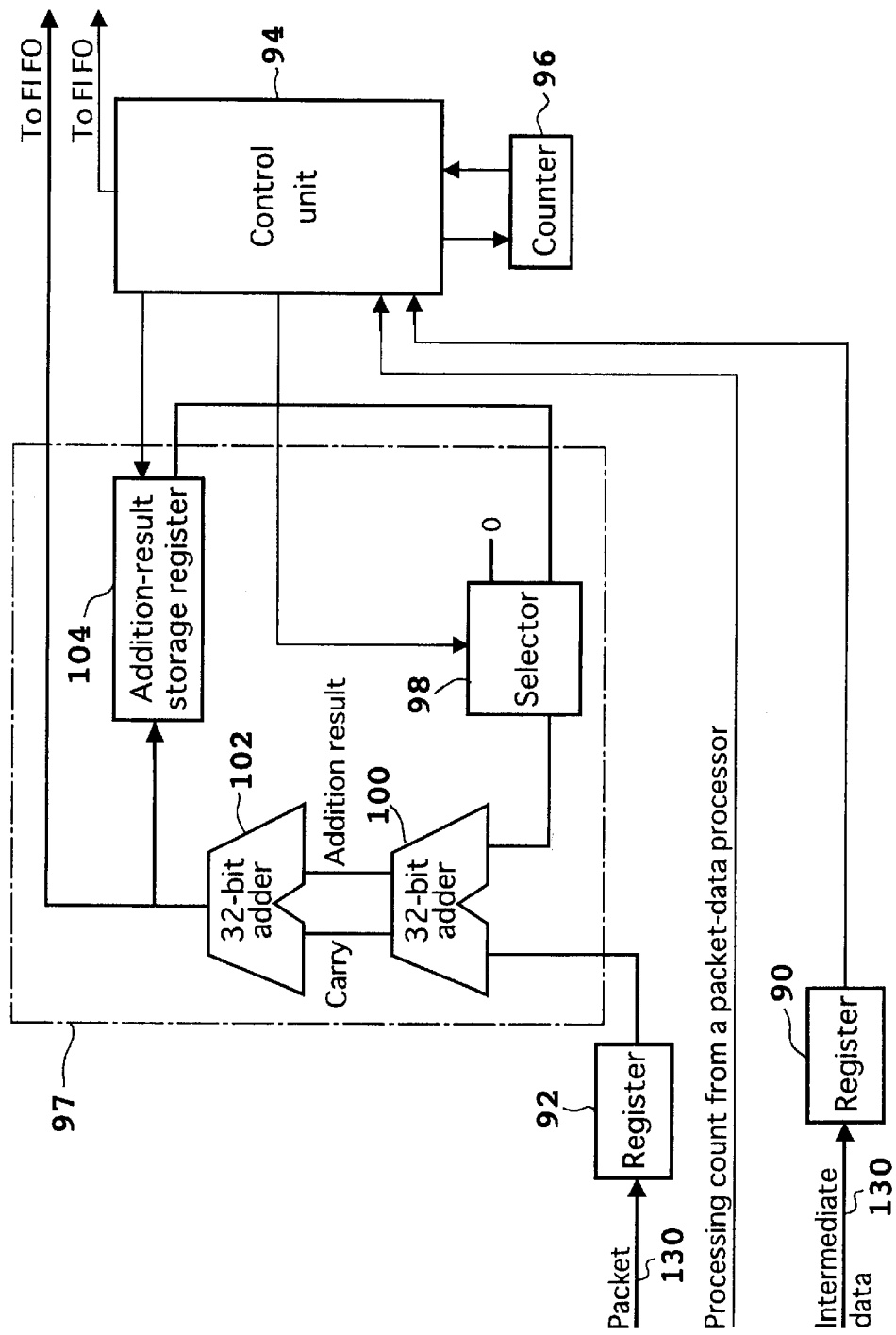

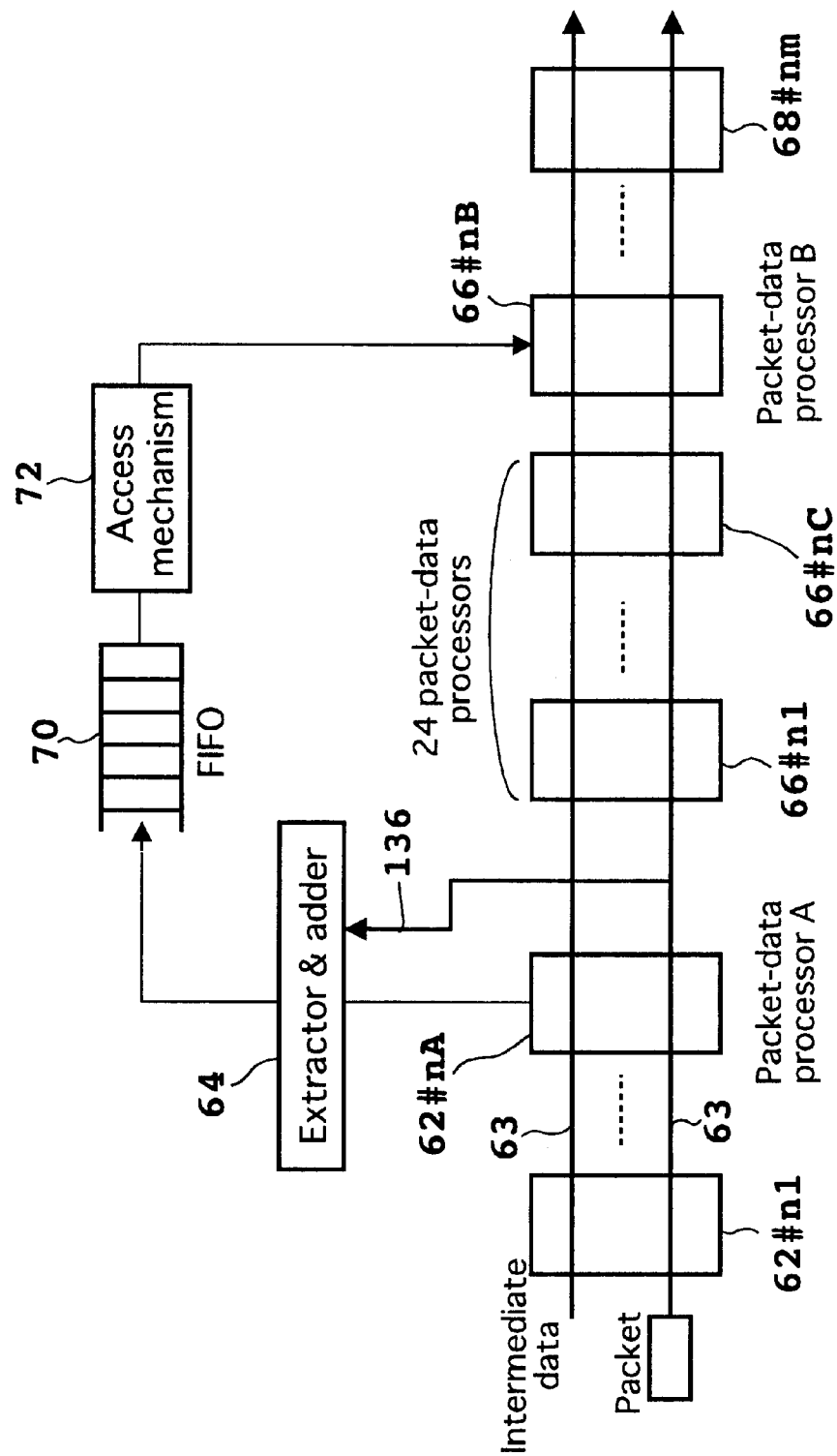

PACKET-DATA PROCESSING APPARATUS

BACKGROUND OF THE INVENTION

1. Field of the Invention

In general, the present invention relates to a packet-data-processing apparatus. More particularly, the present invention relates to improvement of the speed of pipeline processing of packets with a variable length.

2. Description of the Related Art

A network node serving as a relay between IP (Internet Protocol) networks carries out packet processing such as modifying a header of a packet and searching a destination table provided in the apparatus of the node for a destination to which a packet is to be routed. With the improvement of the speed of transmission through the Internet achieved in recent years, it becomes necessary to increase the speed of packet processing carried out by a network node serving as a packet relay. Thus, such a network node employs special hardware for improving the speed of packet processing. In the conventional packet processing, there is adopted a store-and-forward configuration wherein a bus connects a memory to a packet-processing unit typically implemented by a processor or dedicated hardware for carrying out packet processing. To put it concretely, a received packet is stored temporarily in the memory to be subjected to packet processing carried out by the packet-processing unit. After the packet processing, the packet is transmitted to a switch fabric along with data such as information on a destination. The switch fabric searches a destination table for an output route indicated by the information on a destination and outputs the packet to the output route.

In addition, the network node also carries out processing based on information included in each protocol header as part of an operation to process an IP and a protocol of a lower layer. In general, only header information corresponding to the protocol is required for the processing, and no information in a data portion is required. This fact is referred to as processing locality. In order to improve the speed of processing, there has thus also been conceived a packet-data-processing unit having a configuration for carrying out a fixed number of processing steps corresponding to the transmission time of the data to be processed. If such locality exists in the packet processing or the packet processing involves only data up to an IP layer, the processing can be carried out at a high speed in a processing system employing the conceived packet-data-processing unit. On the other hand, the need for diversification of processing in a network node rises, making it necessary to process protocols higher than the IP layer. For example, there has been introduced a technology referred to as a VPN (Virtual Private Network), which allows a public network such as the Internet to be used by the user as a private network without being aware of the fact that the used network is actually a public network. In this VPN technology, there is a protocol for carrying out a tunneling process.

The tunneling is a method used in communication between two remotely located private networks through a public network such as the Internet. To put it concretely, a network node supporting the VPN technology adds a header for the public network to a packet received from a private network in a capsulating process. The network node then passes on the packet to another network node also supporting the VPN technology by way of the public network such as the Internet. The other network node located at another private network carries out a de-capsulating process to remove the header added during the capsulating process. The other network node then transmits the packet in a state prior to the capsulating process to the other private network. Take an L2TP as an example. The L2TP is a protocol requiring the tunneling process. To put it concretely, L2TP, UDP and IP headers are added to and deleted from a PPP packet in the tunneling process. Thus, a network node supporting the VPN technology carries out a capsulating process to add these headers and another network node supporting the VPN technology caries out a de-capsulating process to remove the headers.

In packet processing carried out in the conventional store-and-forward configuration, however, it is necessary to temporarily write packet data into a memory and read out the data back from the memory. Thus, this processing overhead causes a difficulty to speed-up the packet processing. As an entire packet data is stored into a memory at the store-and-forward processing, all the portion of the packet can be an object of processing. Thus, the store-and-forward configuration is capable of keeping up with any kind of processing. In a read operation, however, a processor reads out data from an addressed memory only after the processor supplies the address to the memory device. By the same token, in a write operation, a processor writes data into an address in the memory only after the processor supplies the address to the memory.

In general, however, a cycle time required for reading memory or writing data into memory is longer than a cycle time of a processor instruction. This is similar for the circuit which uses special hardware logic. An overhead of the operation to read out or write data from or into the memory causes the aforementioned problem, making it impossible to carry out the packet processing at a high speed.

In accordance with the technique of processing packet data by giving attention to the locality property of the processing, processing at an IP layer and lower layers can be carried out at a high speed. With this technique, however, it is difficult to store a result of a UDP checksum calculation even if the processor is capable of carrying out an addition repeatedly by executing the same instructions a number of times. This is because, since all the data portion of a UDP payload are used to calculate UDP checksum, the number of times the addition is repeated till completion which is dependent on the length of the packet. And the checksum has to be stored to the field in UDP header. Therefore, each step of calculating checksum itself has a locality, however, the distance between the position of the data where final result of the calculation is obtained and the position of the data where the result is to be stored is varied in dependence on the length of the packet. It is thus impossible to specify the location where the result is to be stored in an instruction to be executed by the packet-data processor that applies the so-called pipeline technique.

We provide a resister accessible by plural processors and a processor calculating checksum of the packet passes the result of processing on another processor accessible to the packet header through the register. With this technology, it may store a result obtained at the end of packet-data to a field of packet header. But it is possible that the checksum is overwritten by reason of the former processor completing process to next packet before the latter processor receives the result, because the length of the packet varies.

For the reason described above, it is difficult to carry out packet-data processing requiring a result of a UDP checksum computation by the prior pipeline technology. Therefore we must provide a general processor specially and assemble to have it the packet-data processing. With this technique, however, it is difficult to carry out the packet-data processing at a high speed.

It is thus an object of the present invention addressing the problems described above to provide a packet-data-processing apparatus capable of processing packets without causing the processing speed to decrease.

SUMMARY OF THE INVENTION

In accordance with an aspect of the present invention, there is provided a packet-data-processing apparatus for processing data of an input packet, the packet-data-processing apparatus comprising a first data-processing unit for computing information on a processing count based on the length of the input packet and outputting the information; a memory; a second data-processing unit for carrying out processing on pieces of data included in the input packet sequentially in accordance with the information on a processing count and storing a first result of processing at the end of the processing carried out on each of the pieces of data in the memory; an access control unit for reading out one of the first results of processing written into the memory least recently from the memory at a request for a read operation and deleting the first result of processing read out from the memory from the memory; a third data-processing unit for making the request for a read operation at reception of data at a predetermined position of the input packet by the third data-processing unit and carrying out processing based on the received input packet and the first result of processing read out by the access control unit at the request; and fourth data-processing unit constituting pipeline data-processing mechanism with said first and third data-processing unit and having latency longer than latency which said second data-processing unit needs to store said first result of processing for said packet with a greatest packet length packet into the memory. The packet-data-processing apparatus is characterized in that the memory provides a sufficient storage area for storing a first result of processing for an input packet having the longest latency since the first result of processing is generated till the first result of processing is supplied to said third data-processing unit.

It is desirable to provide a first set of shift registers connected to each other in cascade for each of the first to fourth data-processing units, and to have the first to fourth data-processing units each carry out processing based on the packet stored in the respective set of shift registers. In addition, it is also desirable to provide a second set of shift registers each for storing intermediate data related to the packet in parallel to the first set of shift registers.

The above and other objects, features and advantages of the present invention as well as the manner of realizing them will become more apparent whereas the invention itself will best understood from a careful study of the following description and appended claims with reference to attached drawings showing some preferred embodiments of the invention.

BRIEF DESCRIPTION OF THE DRAWINGS

FIG. 1 is a diagram showing the principle of the invention;

FIG. 12 shows a sequence chart of the L2TP capsulating process unit shown in FIG. 6;

FIG. 16 is a diagram showing the configuration of an extractor & adder employed in the L2TP capsulating process unit shown in FIG. 15; and FIG. 17 is a diagram showing the configuration of an L2TP de-capsulating process unit employed in the LNS shown in FIG. 14.

DETAILED DESCRIPTION OF THE PREFERRED EMBODIMENTS

Figure 2:
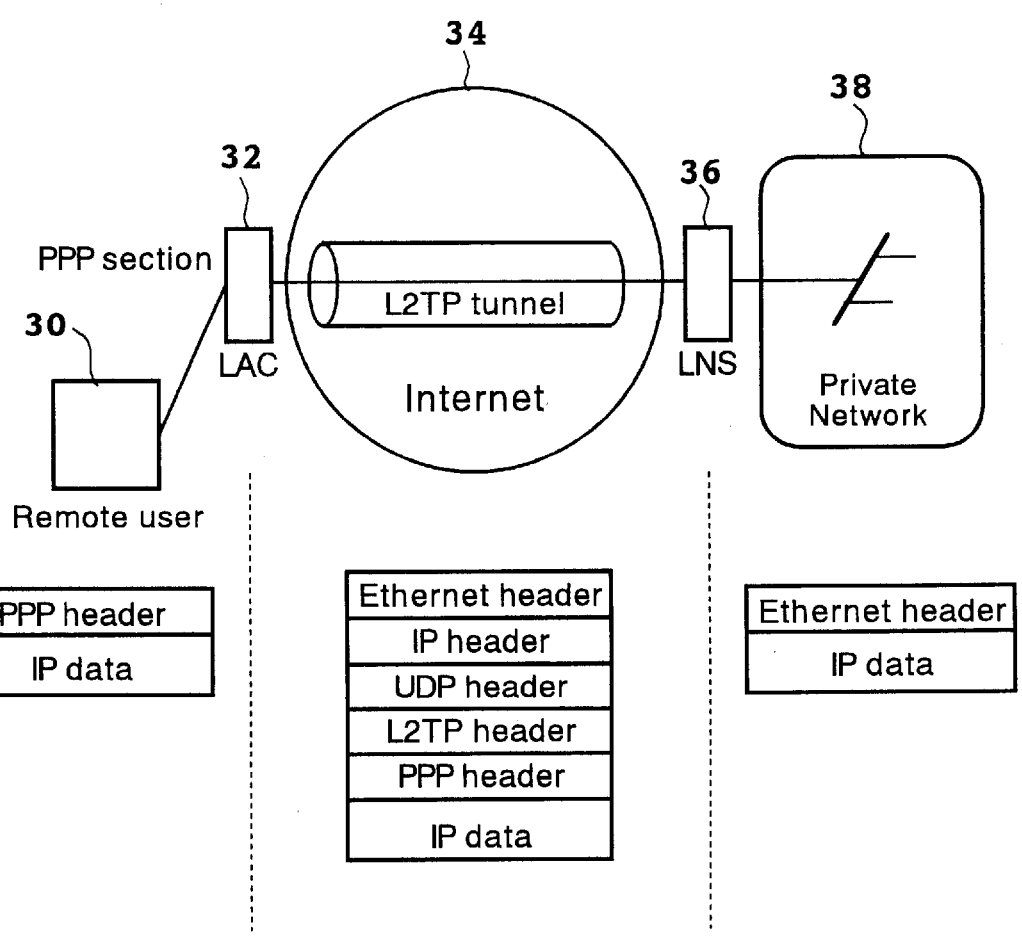
FIG. 2 is a diagram showing the configuration of a VPN network implemented by a first embodiment of the present invention.

Before preferred embodiments of the present invention are explained, the principle of the invention is described. FIG. 1 is a diagram showing the principle of the invention. As shown in the figure, a packet-data-processing apparatus comprises a first data-processing unit 2, a memory 4, a second data-processing unit 6, an access control unit 8, a third data-processing unit 10 and a fourth data-processing unit 12. The first data-processing unit 2 computes information on a processing count based on the length of an input packet and outputs the information. The second data-processing unit 6 carries out processing of pieces of data included in an input packet sequentially in accordance with the information on a processing count and stores a first result of processing at the end of the processing of each piece of data in the memory 4, and notifies the storage into the memory 4 to access control unit 8. The fourth data-processing unit 12 constitutes pipeline data-processing mechanism with the first data-processing unit 2 and the third data-processing unit 10. The data-processing units 2, 10, 12 carry out divided process to be processed. We do not clarify concrete process of the fourth data-processing unit 12. But process latency in the fourth data-processing unit 12 is needed to be longer than latency which the second data-processing unit 6 needs to store the first result of processing to a packet with greatest packet length to be processed into the memory 4. Therefore it is allowed that the fourth data-processing unit 12 only delays a packet. The third data-processing unit 10 makes a request for a read operation from the memory 4 to the access control 8 when the packet is input.

The access control unit 8 reads out one of the first results of processing written into the memory 4 least recently from the memory 4 at a request for a read operation and outputs the result of processing read out from the memory 4 to the third data-processing unit 10. It is possible to assure that each first result of processing supplied to the third data-processing unit 10 is produced for a packet supplied to the third data-processing unit 10; the access control unit 8 and the memory 4 constitute FIFO (First In First Out) memory and supply the first result of processing in accordance with input order, and assure the order; the fourth data-processing unit 12 has latency longer than latency which the second data-processing unit 6 needs to store the first result to a packet with greatest packet length to be processed into the memory 4; and when the third data-processing unit 10 reads a first result of processing from the memory 4, it is assured that the first result of processing to packet to be processed has been written in the memory 4. The third data-processing unit 10 carries out processing to an input packet and a first result of processing read out by the access control unit 8 at the request. As described above, in pipeline data-processing mechanism which processes a packet by pipeline processing, packet processing can be carried out at a high speed, since it carries out calculation to which processes a packet with a variable length and whose process time varies.

First Embodiment

FIG. 2 is a diagram showing the configuration of a VPN network adopting an L2TP protocol as implemented by a first embodiment of the present invention and a packet format. As shown in the figure, the VPN network comprises a remote user 30, an LAC (L2TP Access Concentrator) 32, the Internet 34, an LNS (L2TP Network Server) 36 and a private network 38. The remote user 30 adds a PPP header to IP data in a PPP capsulating process and exchanges packets with the LAC 32 at a PPP section.

The LAC 32 accommodates a plurality of remote users 30 and has the following functions:

(1) When receiving a PPP-section packet from a remote user 30, carry out an L2TP capsulating process to add an L2TP header, a UDP header, an IP header and an Ethernet header to the packet, and transmit the packet to an output route in the Internet 34 indicated by an IP address set in the IP header.

(2) When receiving a packet completing an L2TP capsulating process from the Internet 34, check whether or not an IP address set in the IP header is the IP address of its own.

(i) If the IP address set in the IP header is the IP address of its own, carry out an L2TP de-capsulating process to remove an Ethernet header, an IP header, an L2TP header and a UDP header from the packet and pass on the packet to a remote user 30 indicated by the IP address.

(ii) If the IP address set in the IP header is not the IP address of its own, on the other hand, relay the packet to an output route in the Internet 34 indicated by the IP address set in the IP header.

The Internet 34 is a network for relaying a packet in accordance with a TCP/IP protocol. The LNS 36 accommodates a plurality of private networks 38 and has the following functions:

(1) When receiving a packet from a terminal accommodated by the private network 38, carry out an L2TP capsulating process to add an L2TP header, a UDP header, an IP header and a PPP header to the packet, and transmit the packet to an output route in the Internet 34 indicated by a MAC address set in the Ethernet header. The packet received from the terminal includes the Ethernet header in IP data thereof.

(2) When receiving a packet from the Internet 34, check whether or not an IP address set in the IP header is the IP address of its own.

(i) If the IP address set in the IP header is the IP address of its own, carry out an L2TP de-capsulating process to remove an IP header, an L2TP header, a PPP header and a UDP header from the packet and pass on the packet to a private network 38 indicated by a destination IP address.

(ii) If the IP address set in the IP header is not the IP address of its own, on the other hand, relay the packet to an output route in the Internet 34 indicated by the IP address set in the IP header.

The present invention can be applied to a case in which processing such as computation of a checksum of data with a variable length is carried out. For example, the present invention is applicable to calculation of a checksum to be set in a UDP header in an L2TP capsulating process carried out by the LAC 32 or the LNS 36, and an operation to justify an L2TP checksum set in a UDP header in an L2TP de-capsulating process carried out by the LAC 32 or the LNS 36. This embodiment exemplifies a case in which the present invention is applied to an L2TP capsulating process and an L2TP de-capsulating process, which are carried out by the LNS 36.

Figure 3:
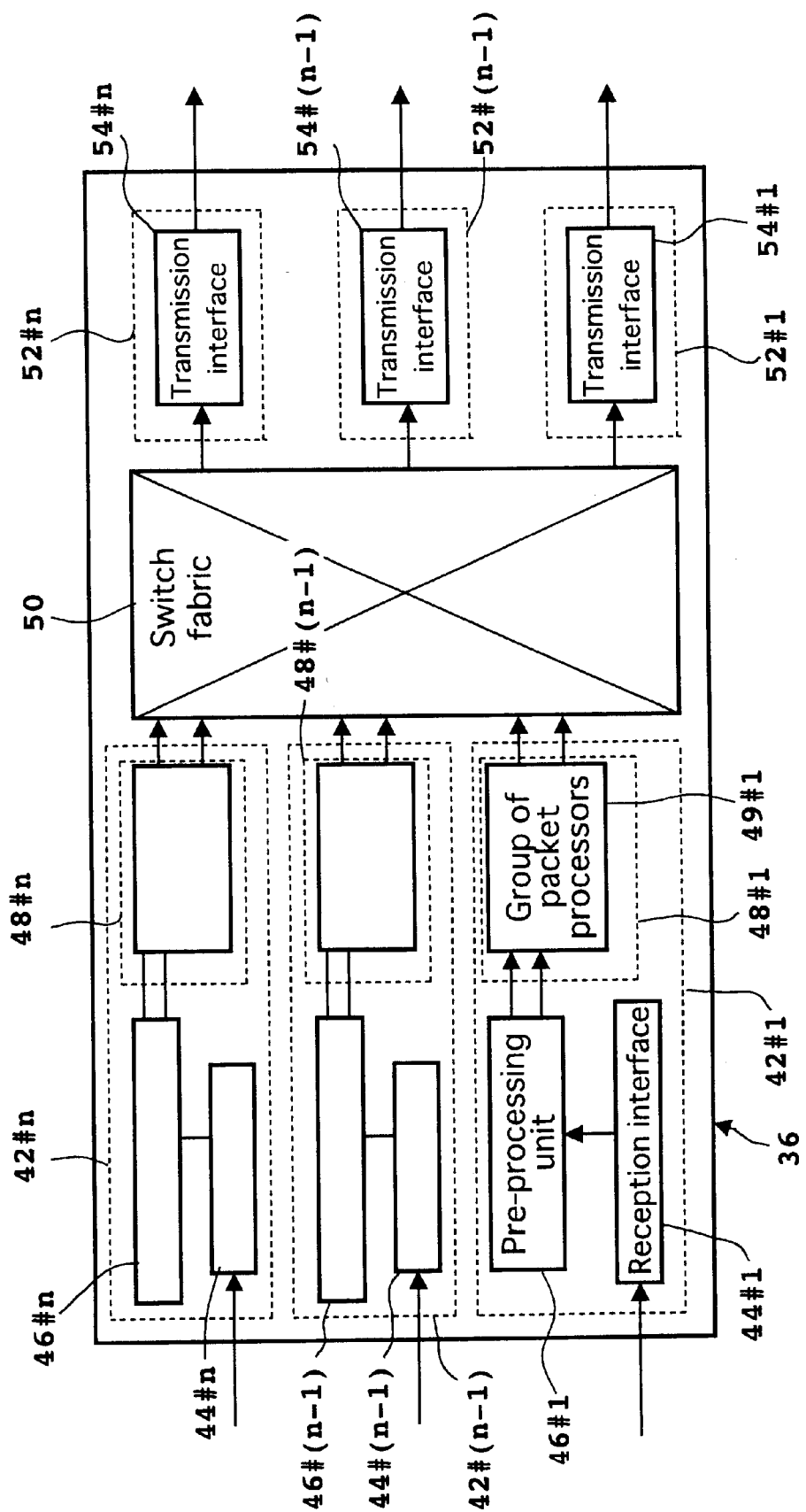
FIG. 3 is a diagram showing the configuration of an LNS employed in the VPN network shown in FIG. 2.

FIG. 3 is a diagram showing the configuration of the LNS 36 employed in the VPN network shown in FIG. 2. As shown in FIG. 3, the LNS 36 comprises a plurality of reception IF units 42#$i$ where i=1 to n, a switch fabric 50 and a plurality of transmission IF units 52#$i$ where i=1 to n. When receiving a packet from a transmission line, the reception IF unit 42#$i$ carries out an L2TP capsulating or de-capsulating process on the packet and supplies the packet completing the L2TP capsulating or de-capsulating process to the switch fabric 50 along with routing information. In this embodiment, the reception IF unit 42#1 carries out an L2TP capsulating process on a packet while the reception IF unit 42#$n$ carries out an L2TP de-capsulating process on a packet. The other reception IF units 42#$i$ where i=2 to (n−1) carry out an L2TP capsulating or de-capsulating process on a packet. A reception IF unit 42#$i$ comprises a reception interface unit 44#$i$, a pre-processing unit 46#$i$ and a L2TP capsulating process unit 48#$i$. The reception interface unit 44#$i$ receives a packet from a transmission line in accordance with a predetermined physical interface, converts the packet into a signal conforming with an internal physical interface of the apparatus, and supplies the signal to the pre-processing unit 46#$i$.

Figure 4:
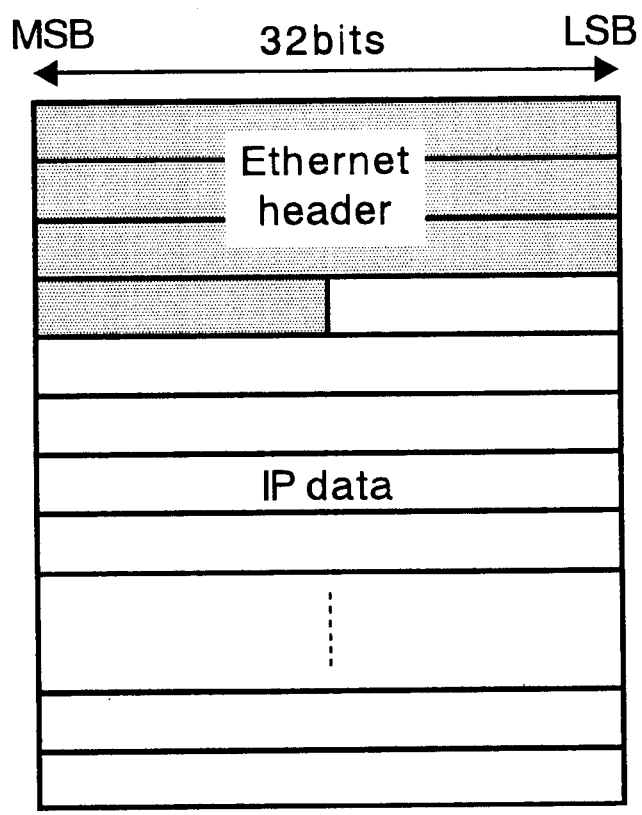
FIG. 4 is a diagram showing the format of a packet exchanged between the LNS and a private network.

FIG. 4 is a diagram showing the format of a packet exchanged between the LNS 36 and the private network 38. As shown in the figure, a packet received by the reception interface unit 44#1 includes an Ethernet header in IP data thereof.

Figure 5:
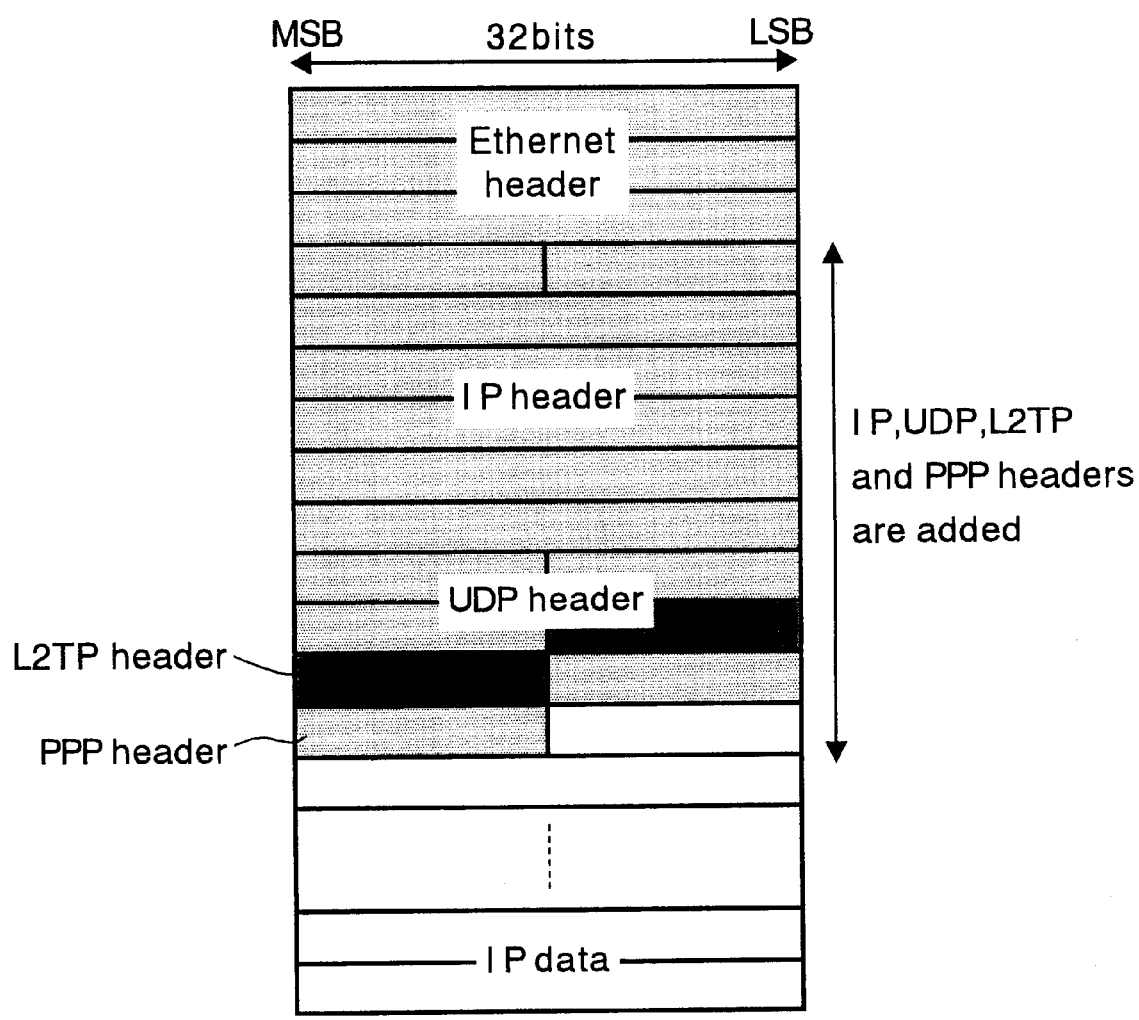
FIG. 5 is a diagram showing the format of a packet completing an L2TP capsulating process.

FIG. 5 is a diagram showing the format of a packet capsulated in an L2TP capsulating process and exchanged between the LNS 36 and the Internet 34. As shown in the figure, a packet received by the reception interface unit 44#$n$ comprises IP data, an Ethernet header, an IP header, a UDP header, an L2TP header and a PPP header. When receiving a packet synchronously with a clock signal not shown in the figure, the pre-processing unit 46#$i$ generates a flag indicating the beginning of the packet and converts the packet from serial data into parallel data of typically 32 bits. The packet completing the process generating a flag and the serial-to-parallel conversion is then supplied to the L2TP capsulating process unit 48#i.

Figure 6:
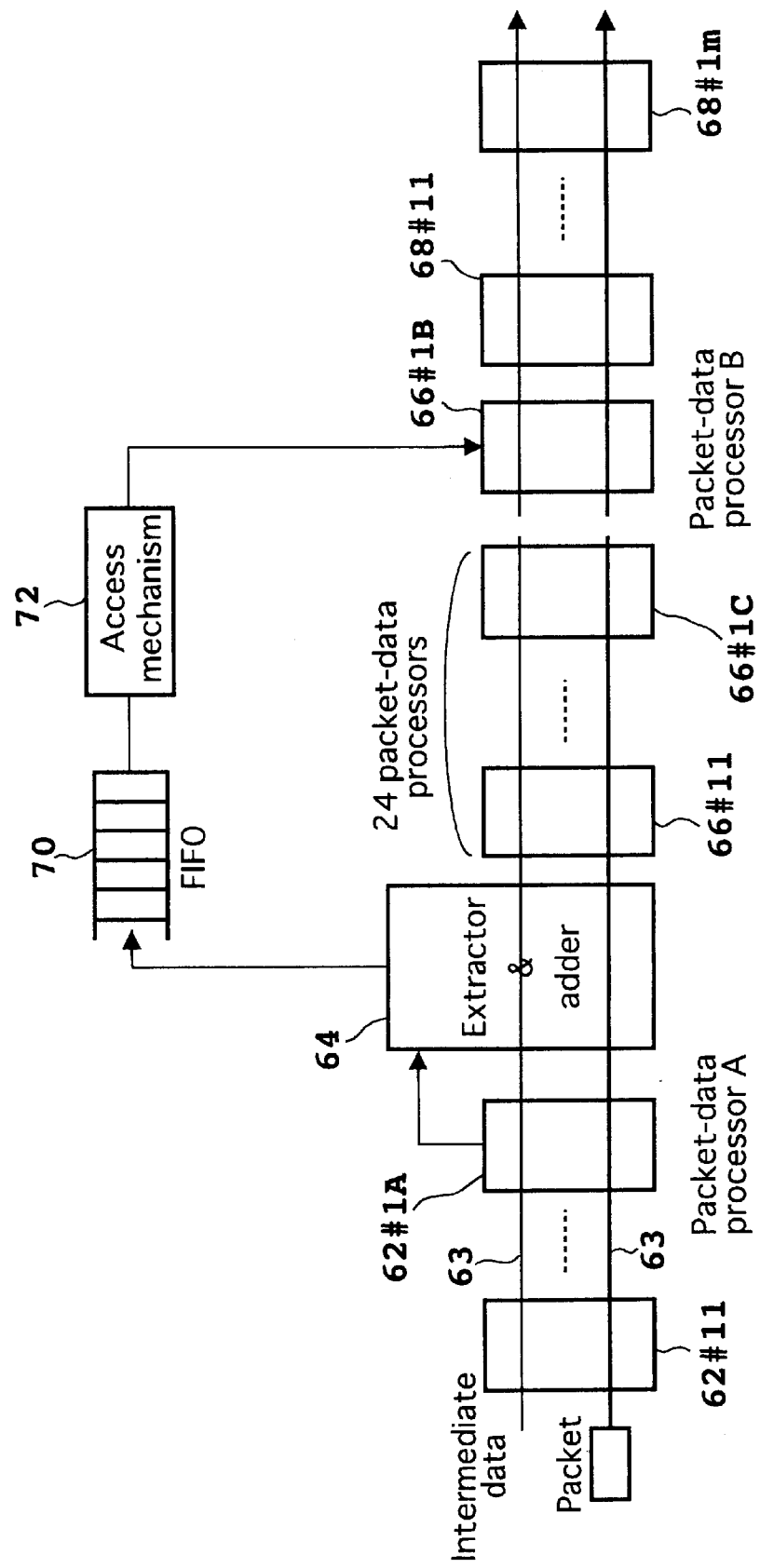
FIG. 6 is a diagram showing the configuration of an L2TP capsulating process unit employed in the LNS shown in FIG. 3.

FIG. 6 is a diagram showing the configuration of the L2TP capsulating process unit 48#1 (packet-processing unit) employed in the LNS shown in FIG. 3. As shown in FIG. 6, the L2TP capsulating process unit 48#1 comprises a plurality of packet-data pre-processors 62#1j (where j=1, . . . , A), an extractor & adder 64, a plurality of packet-data intermediate processors 66#1j (where j=1, . . . , C, B), a plurality of packet-data post-processors 68#1j (where j=1 to m), a FIFO buffer 70 and an access mechanism unit 72. The packet-data pre-processors 62#1j (where j=1, . . . , A), the extractor & adder 64, the packet-data intermediate processors 66#1j (where j=1, . . . , C, B) and the packet-data post-processors 68#1j (where j=1 to m) are connected to each other by a bus 63 in a pipeline configuration.

Figure 7:
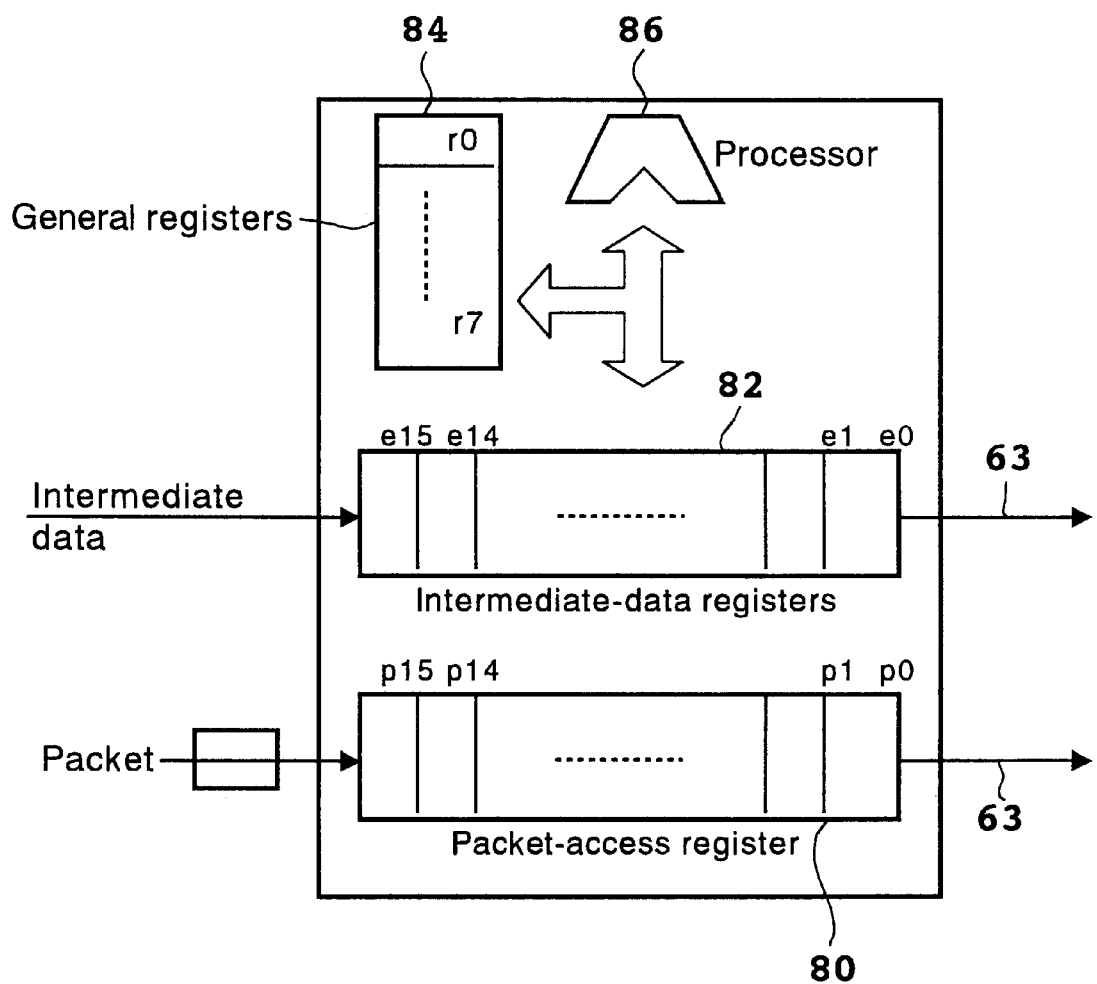
FIG. 7 is a diagram showing the configuration of a packet-data processor employed in the L2TP capsulating process unit shown in FIG. 6.

FIG. 7 is a diagram showing the configuration of each of the packet-data processors 62#1, 66#1 and 68#1 employed in the L2TP capsulating process unit 48#1 shown in FIG. 6. That is to say, the packet-data pre-processors 62#1j (where j=1, . . . , A), the packet-data intermediate processors 66#1j (where j=1, . . . , C, B) and the packet-data post-processors 68#1j (where j=1 to m) all have about the same configuration. As shown in FIG. 7, the processors each comprise a packet access register 80, an intermediate-data register 82, general registers 84 and a processing unit 86. The packet access register 80 is a shift register comprising a plurality of stages p0 to p15 for storing a processing unit of a packet completing an L2TP capsulating process as shown in FIG. 5. The number of stages p0 to p15 is typically determined so as to accommodate the processing unit of a packet. Thus, the packet access register 80 can be used to store fixed packet data of up to the processing unit without regard to the length of the packet itself. In this way, the packet-data pre-processor 62#1, the packet-data intermediate-processor 66#1 or the packet-data post-processor 68#1 employing the packet access register 80 is capable of processing the packet data stored in the packet access register 80. Assume that the processing unit is 64 bytes (=64×8 bits) and each of the stages is a 32-bit register. In this case, the number of stages in the packet access register 80 is 16 (=64×8/32).

The intermediate-data register 82 is a shift register comprising stages e0 to e15 for storing intermediate data produced by the packet-data preprocessor 62#1j, the packet-data intermediate-processor 66#1 or the packet-data post-processor 68#1 employing the packet access register 80. The intermediate-data register 82 has the same configuration as the packet access register 80. Thus, pieces of packet data can be shifted through the packet access register 80 synchronously with an operation to shift pieces of intermediate data through the intermediate-data register 82. The general registers 84 is a set of ordinary registers r0 to r7 each used by the processing unit 86 as a working register during processing carried out by the processing unit 86. Typically, the general registers 84 comprises 8 ordinary registers each having a length of 32 bits. The processing unit 86 is a unit for carrying out processing on pieces of data stored in the general registers 84 by execution of programs. As described above, pieces of packet data are shifted through the packet access register 80 synchronously with an operation to shift pieces of intermediate data through the intermediate-data register 82 by an internal clock signal not shown in the figure, being output to the bus 63. The packet-data pre-processors 62#1j where j=1, . . . , A shown in FIG. 6 are a series of processors for generating a packet to undergo an L2TP capsulating process from a packet received from the pre-processing unit 46#1 and generating intermediate data required by the extractor & adder 64 and other units. The number of packet-data pre-processor 62#1j where j=1 and so on is determined by, among others, the type of intermediate data required by the extractor & adder 64 and the other units. The packet-data pre-processors 62#1j where j=1 and so on have the following functions:

(1) When receiving a packet with a format shown in FIG. 4 synchronously with a clock signal, form a judgment as to whether or not it is necessary to carry out an L2TP capsulating process on the packet. The judgment is based on a transmission-destination address included in the packet. To be more specific, if a transmission-destination IP address included in a packet received from the private network 38 is an IP address cataloged in a table to indicate that an L2TP capsulating process is required, it is then deemed necessary to carry out the L2TP capsulating process on the packet.

(i) In the case of a packet requiring an L2TP capsulating process,
(a) Use the intermediate-data register 82 to transfer a flag indicating the need for an L2TP capsulating process as intermediate data.
(b) Generate a packet having the format shown in FIG. 5 by adding a PPP header, an L2TP header, a UDP header, an IP header and an Ethernet header. A transmission-destination address set in the added IP header or the like is typically an IP address of an LAC or the like accommodating a terminal indicated by an address set in the IP header or the Ethernet header of the packet. As described earlier, the Ethernet header is shown in FIG. 4. The address of a terminal serving as a destination of transmission and the IP address of a packet-relaying apparatus such as the LAC accommodating the terminal are cataloged in advance in a table not shown. Thus, the transmission-destination address set in the added IP header or the like is obtained by searching the table for the IP address of the LAC associated with the address of the transmission-destination terminal. There is also executed another function to fill up a checksum field of the UDP header with 0s. If a packet ends not on the boundary of a processing unit, add 0s to make the end of the packet coincide with the boundary of a processing unit. For example, if the processing unit is 4 bytes in size, 0s are added to the tail of a packet to fill up a 4-byte processing unit in which the packet ends. However, a length field of the UDP header is set at a value representing the length of the packet prior to this boundary adjustment. 0s are used since 0s do not have an effect on a result of checksum calculation. Thus, by filling up the checksum field with 0s, the checksum field can be included in the calculation of a checksum. As a result, the calculation of a checksum does not become complex since it is not necessary to form a judgment as to whether or not to include the checksum field in the calculation.
(c) Use the intermediate-data register 82 to transfer a flag indicating a predetermined position in a packet as intermediate data. An example of the predetermined position is the beginning of the UDP header.
(ii) In the case of a packet not requiring an L2TP capsulating process,
(a) Use the intermediate-data register 82 to transfer a flag indicating that the packet does not require an L2TP capsulating process.

(b) Use the intermediate-data register 82 to transfer a flag indicating a predetermined position in a packet shown in FIG. 4 as intermediate data. An example of the predetermined position is the beginning of the Ethernet header. The packet-data pre-processor 62#1j where j=1, . . . , A and/or the extractor & adder 64 may change the predetermined position indicated by this flag to match processing carried out by the packet-data intermediate-processor 66#1j or another unit referring to the position at a later stage.

(2) If an L2TP process is required, compute a processing count to be used by the extractor & adder 64 to compute a checksum. Typically, the processing count is computed as follows. The length of the UDP data is acquired from the length field of the UDP header. The length of the UDP data is a value expressing the sum of the length of the UDP header and the length of the UDP data portion in terms of bytes. The sum of the length of the UDP data, the length of the IP header and the length of the Ethernet header is divided by a byte count representing the processing unit of the extractor & adder 64 to result in a quotient. If the product overflows, 1 is added to the quotient. To put it concretely, assume that the processing unit is 4 bytes. In this case, the sum of the length of the UDP data, the length of the IP header and the length of the Ethernet header is stored in a shift register and then shifted to the right by 2 bits. If the shift operation results in a carry, 1 is added to a quotient remaining in the shift register. It should be noted that, instead of the right-shift operation described above, the processing count can be a result obtained from a division of the contents of the length field of the UDP header by 4 (that is, length/4) or the result plus 1 (length/4+1) in case of an overflow. The processing count can be any other value representing the number of times cumulative processing is to be carried out by the extractor & adder 64. To put it concretely, a flag set in the intermediate-data register 82 is examined to form a judgment as to whether or not the packet requires an L2TP capsulating process. If the packet requires an L2TP capsulating process, typically, the packet-data pre-processor 62#11 executes function (1) described above to generate a packet with the format shown in FIG. 5 while the packet-data pre-processor 62#1A executes function (2) to compute the processing count needed by the extractor & adder 64 and stores the count in an extractor & adder register (AR register). The AR register is a register, which is provided specially for the packet-data pre-processor 62#1A and can be accessed by the extractor & adder 64.

Figure 8:
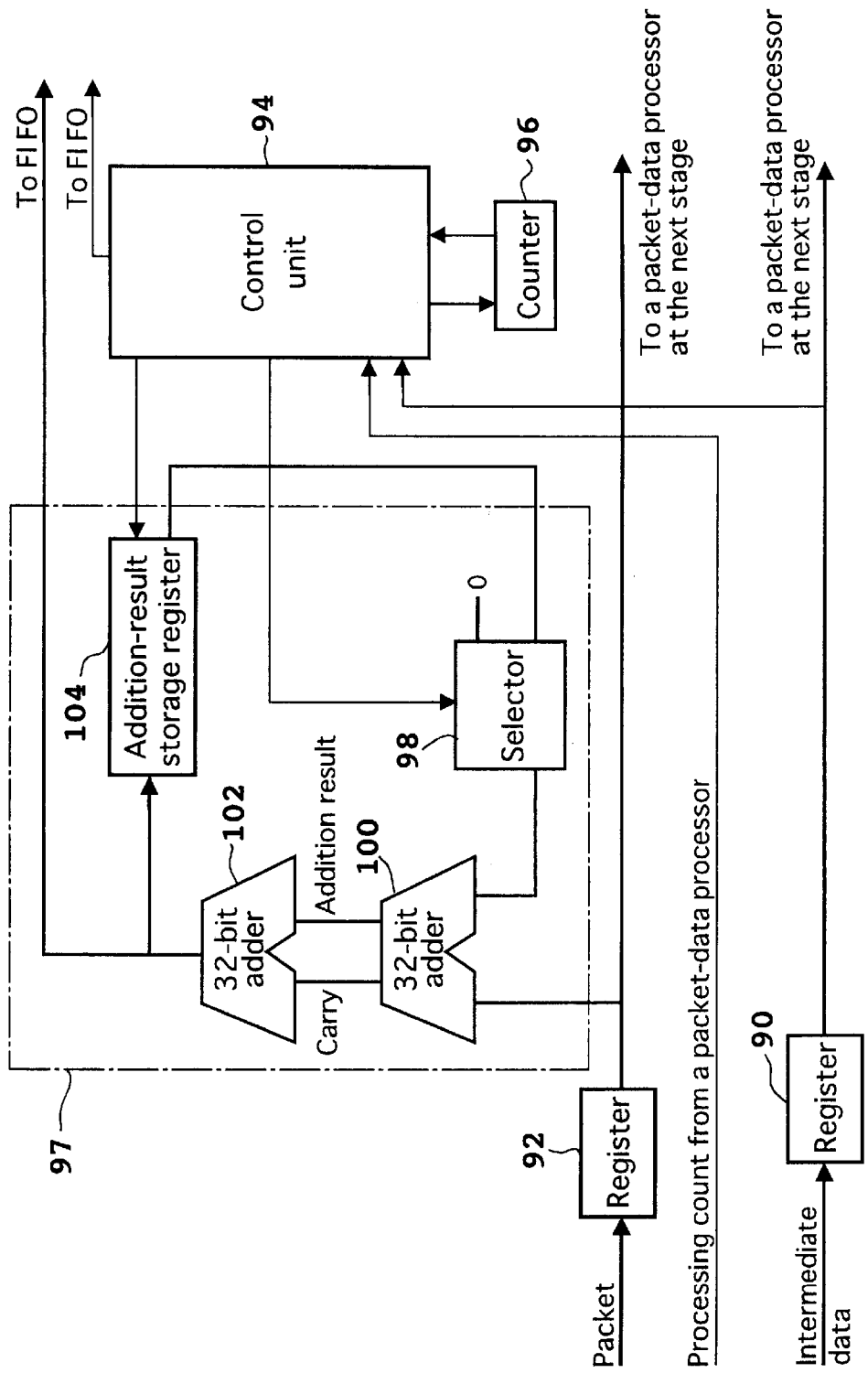
FIG. 8 is a diagram showing the configuration of an extractor & adder employed in the L2TP capsulating process unit shown in FIG. 6.

FIG. 8 is a diagram showing the configuration of the extractor & adder 64 employed in the capsulating process unit shown in FIG. 6. The extractor & adder 64 shown in FIG. 8 is special hardware comprising registers 90 and 92, a control unit 94, a counter 96 and a cumulative adder 97. The register 90 is a 32-bit register for storing intermediate data and outputting the data to a packet-data intermediate-processor 66#11 at the following stage synchronously with a clock signal by way of the control unit 94 and the bus 63. The intermediate data includes a flag indicating whether or not an L2TP capsulating process is needed and a flag showing a predetermined position in the packet. The register 92 is a 32-bit register used for storing packet data and outputting the packet data to the bus 63 synchronously with a clock signal. The bus 63 is connected to an adder 100 and the packet-data intermediate-processor 66#11 at the following stage. The register 90 and the register 92 each form a stage. This is because the extractor & adder 64 cumulatively processes one's-complement data in processing units each having a size of 32 bits. The extractor & adder 64 can be implemented as special hardware like the one shown in FIG. 8 or a processor.

Figure 9:
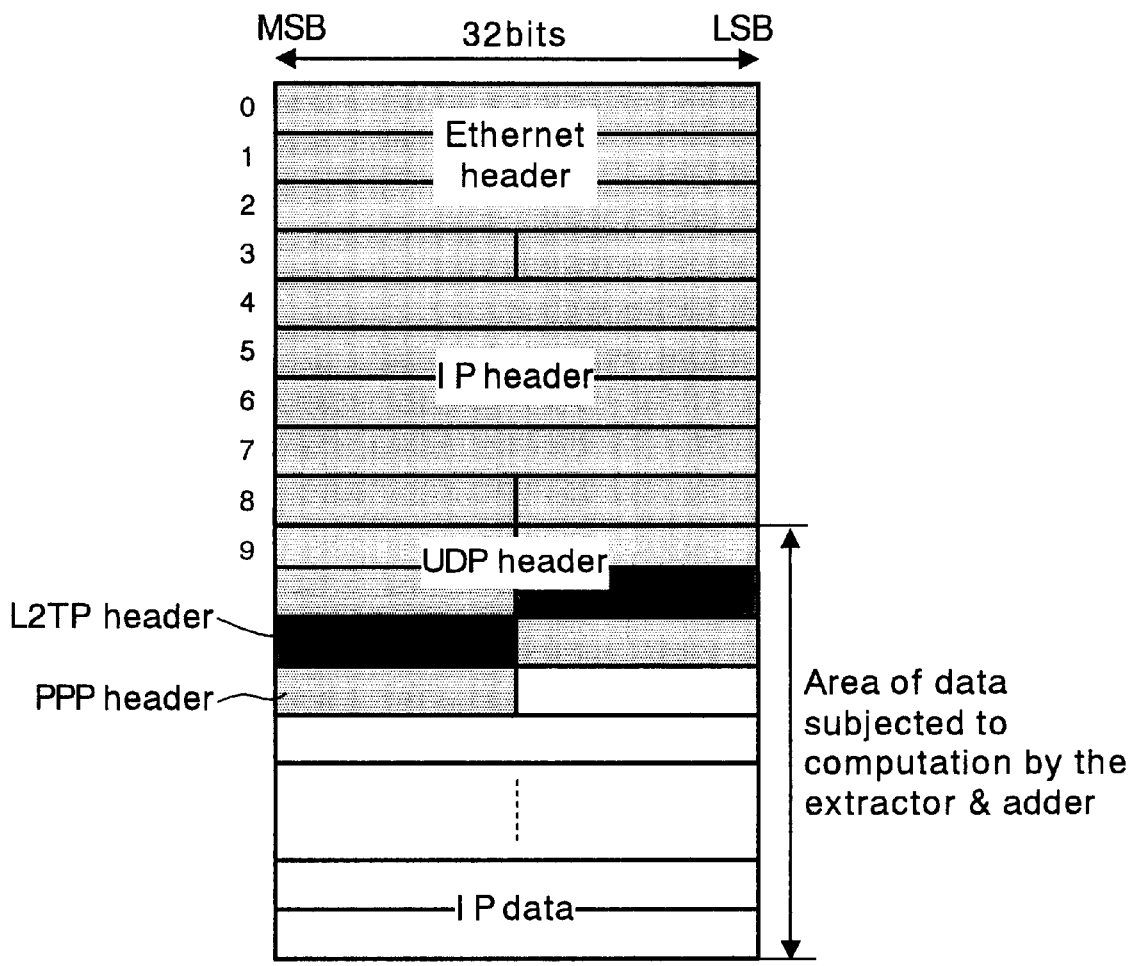
FIG. 9 is a diagram showing an area of data subjected to computation of a checksum carried out by the extractor & adder.

FIG. 9 is a diagram showing an area of data subjected to computation of a checksum carried out by the extractor & adder 64. As shown in the figure, the area of data subjected to checksum computation starts from the beginning of the UDP header and ends at the end of the IP data. Since the extractor & adder 64 carries out processing in units each having a size of 4 bytes, however, the area of data subjected to checksum computation begins from a start area on a 4-byte boundary and ends at the last 4 bytes on the 4-byte boundary of the IP data as shown in FIG. 9. To put it concretely, the start area is the second quadlet of the UDP header or the tenth quadlet from the start of the Ethernet header where 1 quadlet is a unit of 4 bytes.

The control unit 94 has the following functions:

(1) Form a judgment as to whether or not an L2TP capsulating process is required by referring to a flag indicating whether or not the process is required. The flag is stored in the register 90. If an L2TP capsulating process is required, execute functions (2) to (7) described below. If no L2TP capsulating process is required, on the other hand, skip functions (2) to (7).

(2) When receiving the beginning of a packet, read out a processing count from the AR register of the packet-data pre-processor 62#1A and sets the count in the counter 96.

(3) Decrement the contents of the counter 96 synchronously with a clock signal not shown in the figure.

(4) Disable an addition-result register 104 during a period between the arrival of the beginning of the packet and an operation to supply data at the start of the area of data subjected to checksum computation carried out by the extractor & adder 64. That is to say, the addition-result register 104 is disabled during a period corresponding to data of the first 9 quadlets of the packet shown in FIG. 9.

(5) Output a select signal to a selector 98 to select "0" and enable the addition-result register 104 when data at the start of the area of data subjected to checksum computation carried out by the extractor & adder 64 is supplied. That is to say, the addition-result register 104 is enabled when the 10th quadlet from the beginning of the packet shown in FIG. 9 is supplied.

(6) Output a select signal to the selector 98 to select the output of the addition-result register 104 when data following the end of the area of data subjected to checksum computation carried out by the extractor & adder 64 is supplied.

(7) When the last data of the area of data subjected to checksum computation of the extractor & adder 64 is supplied, that is, when the contents of the counter 96 become 0, output a write address to the FIFO buffer 70, activate a write enable signal and write the output of an adder 102 into the FIFO buffer 70.

The contents of the counter 96 are decremented synchronously with the same apparatus internal clock signal as the registers 90 and 92. The cumulative adder 97 has the selector 98, the adder 100, the adder 102 and the addition-result register 104. The adder 100 and the adder 102 are each a processing circuit for computing a one's-complement sum. The adder 100 adds a 4-byte unit of packet data output by the register 92 to data output by the selector 98 and outputs the sum and a carry to the adder 102. The adder 102 adds the carry to the sum computed by the adder 100 and outputs the result of the addition to the FIFO buffer 70 and the addition-result register 104. The addition-result register 104 stores the result of the addition produced by the adder 102 at activation of an enable signal generated by the control unit 94. The addition-result register 104 outputs data stored therein to the selector 98.

The packet-data intermediate-processor 66#1*j* where j=1 to C are a group of processors for carrying out preprocessing and the like for processing carried out by the packet-data intermediate-processor 66#1B. The packet-data intermediate-processor 66#*ij* where j=1 to C are capable of carrying out not only preprocessing for the packet-data intermediate-processor 66#1B but also other kinds of processing. When the beginning of a packet is supplied to the packet-data intermediate-processor 66#1B, the packet-data intermediate-processor 66#1B reads out a result of addition for the packet from the FIFO 70. Thus, it is necessary for the extractor & adder 64 to complete the addition and store a result of the addition in the FIFO buffer 70 before the beginning of the packet is supplied to the packet-data intermediate-processor 66#1B.

Assume that the maximum length of a packet is 1,518 bytes where the length of a packet is defined as the sum of the length of the UDP header and the length of the UDP data. In this case, in order to complete processing of a packet with the maximum length in the extractor & adder 64, it takes a time corresponding to about 380 (=1,518/4) clocks where the divisor 4 represents the processing unit of the extractor & adder 64 in terms of bytes. At the end of the processing, the beginning of the packet is being supplied to the 24th packet-data intermediate processor 66#1*j* from the extractor & adder 64 or the packet-data intermediate-processors 66#1*j* where j=24 (=380/16) and 16 is the number of stages of the packet access register 80 employed in the packet-data intermediate-processor 66#1*j*. Thus, a result of checksum computation can be used only in processing carried out by the 24th packet-data intermediate processor 66#1*j* from the extractor & adder 64 and subsequent packet-data intermediate processors 66#1*j* or the packet-data intermediate-processors 66#1*j* where j>24. Thus, the 25th packet-data intermediate processor 66#1*j* from the extractor & adder 64 (or the packet-data intermediate-processors 66#1*j* where j=25), which should be capable of carrying out processing at a maximum speed, uses the result of checksum calculation. This packet-data intermediate-processors 66#1*j* where j=25 is referred to as a packet-data processor B denoted by reference numeral 66#1B. Thus, the number of stages of the packet-data intermediate-processors 66#1*j* where j=1 to C is 24. As is obvious from the description given above, 24 packet-data intermediate-processors 66#1*j* where j=1 to 24 and more than 384 stages of the packet access register 80 are needed for carrying out the pre-processing required before processing by the packet-data intermediate-processors 66#1B where the 384 stages are a product of 24 processors× 16 4-byte shift register registers per processor. It should be noted, however, that the 24 or more packet-data intermediate-processors 66#1*j* where j=1 to 24 or greater are not absolutely required. Instead, another processor can be employed as long as the other processor is capable of carrying out the pre-processing. Nevertheless, it is desirable to provide a number of packet-data intermediate-processors 66#1*j*. This is because, if new processing becomes necessary, an available packet-data intermediate-processor 66#1*j* can be allocated to the new processing to provide a merit of no necessity to newly add hardware. The packet-data intermediate-processors 66#1*j* where j=1, 2 and so on carry out the following pieces of pre-processing prior to processing carried out by the packet-data intermediate-processor 66#1B.

(1) Form a judgment as to whether or not an L2TP capsulating process is required by referring to a flag indicating whether or not the process is required. The flag is stored in the intermediate-data register 82. If an L2TP capsulating process is required, execute pieces of pre-processing (2) and (3) described below. If no L2TP capsulating process is required, on the other hand, skip pieces of processing (2) and (3).

(2) Extract fields set in a pseudo header from an input packet.

Figure 10:
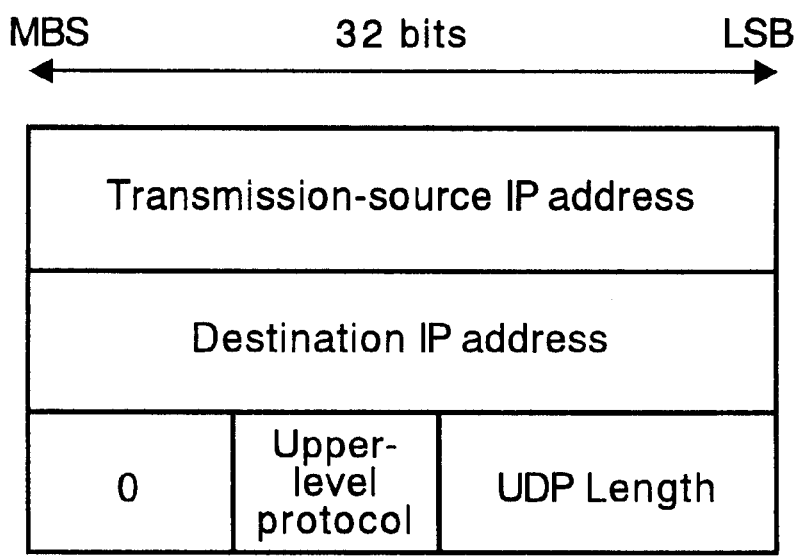
FIG. 10 is a diagram showing the format of a header.

FIG. 10 is a diagram showing the format of the header. As shown in the figure, the pseudo header includes fields such as the IP address of a transmission source, the IP address of a transmission destination and a UDP length. The IP address of a transmission source and the IP address of a transmission destination are set in the IP header shown in FIG. 5. The IP address of a transmission source is the IP address of the LNS employing this packet-data intermediate-processor 66#1*j* and the IP address of a transmission destination is the address of a packet-relaying apparatus such as an LAC or an LNS supporting the L2TP accommodating a destination terminal or a private network connected to a destination terminal respectively. The UDP length is a value to be set in the UDP header in FIG. 5.

(3) Find a 16-bit one's-complement sum of first 16-bit data in the pseudo header and first 16-bit data in the UDP header, which are not processed by the extractor & adder 64, and store the sum in the intermediate-data register 82.

The packet-data intermediate-processor 66#1B has the following functions:

(1) Form a judgment as to whether or not an L2TP capsulating process is required by referring to a flag indicating whether or not the process is required. The flag is stored in the intermediate-data register 82. If an L2TP capsulating process is required, execute functions (2) to (5) described below. If no L2TP capsulating process is required, on the other hand, skip functions (2) to (5).

(2) When receiving the beginning of a packet indicated by a flag, request the access mechanism unit 72 to read out a result of computation from the FIFO buffer 70. The beginning of a packet can be the beginning of the UDP header.

(3) Find a 16-bit one's-complement sum of 16 most significant bits and 16 least significant bits of a processing result produced by the extractor & adder 64 and stored in the FIFO buffer 70.

(4) Read out the 16-bit one's-complement sum of first 16-bit data in the pseudo header and first 16-bit data in the UDP header from the intermediate-data register 82 and add the sum to the result produced by function (3) to give a one's-complement sum.

(5) Store the result produced by function (4) in the checksum field in the UDP header of the packet. This is because the result is a UDP checksum to be found eventually.

Among other processing, the packet-data post-processors 68#1*j* where j=1 to m find routing information of a packet and store the information in the intermediate-data register 82. The FIFO buffer 70 is a memory for accumulating results of computation produced by the extractor & adder 64. It should be noted that the FIFO buffer 70 has a dual-port configuration allowing the extractor & adder 64 to write a result of computation therein and the access mechanism unit 72 to read out a result of computation therefrom at the same time.

As described above, it takes 380 clocks for data at the head of a packet with the maximum length to reach the packet-data intermediate-processor 66#1C since its departure from the extractor & adder 64. During the period of the 380 clocks, 24 (=380/16) pieces of packet data each having a minimum length of 64 bytes (or 24 64-byte processing units) can be input. Thus, the FIFO buffer 70 must have a storage capacity capable of storing at least 24 results of computation. When receiving a request for a read operation from the packet-data intermediate-processor 66#1C, the access mechanism unit 72 reads out a result of computation at the head of the FIFO buffer 70, that is, a result of computation stored in the FIFO buffer 70 least recently, and then shifts each of the remaining results of computation to the head of the FIFO buffer 70 by a slot required for storing one result.

Figure 11:
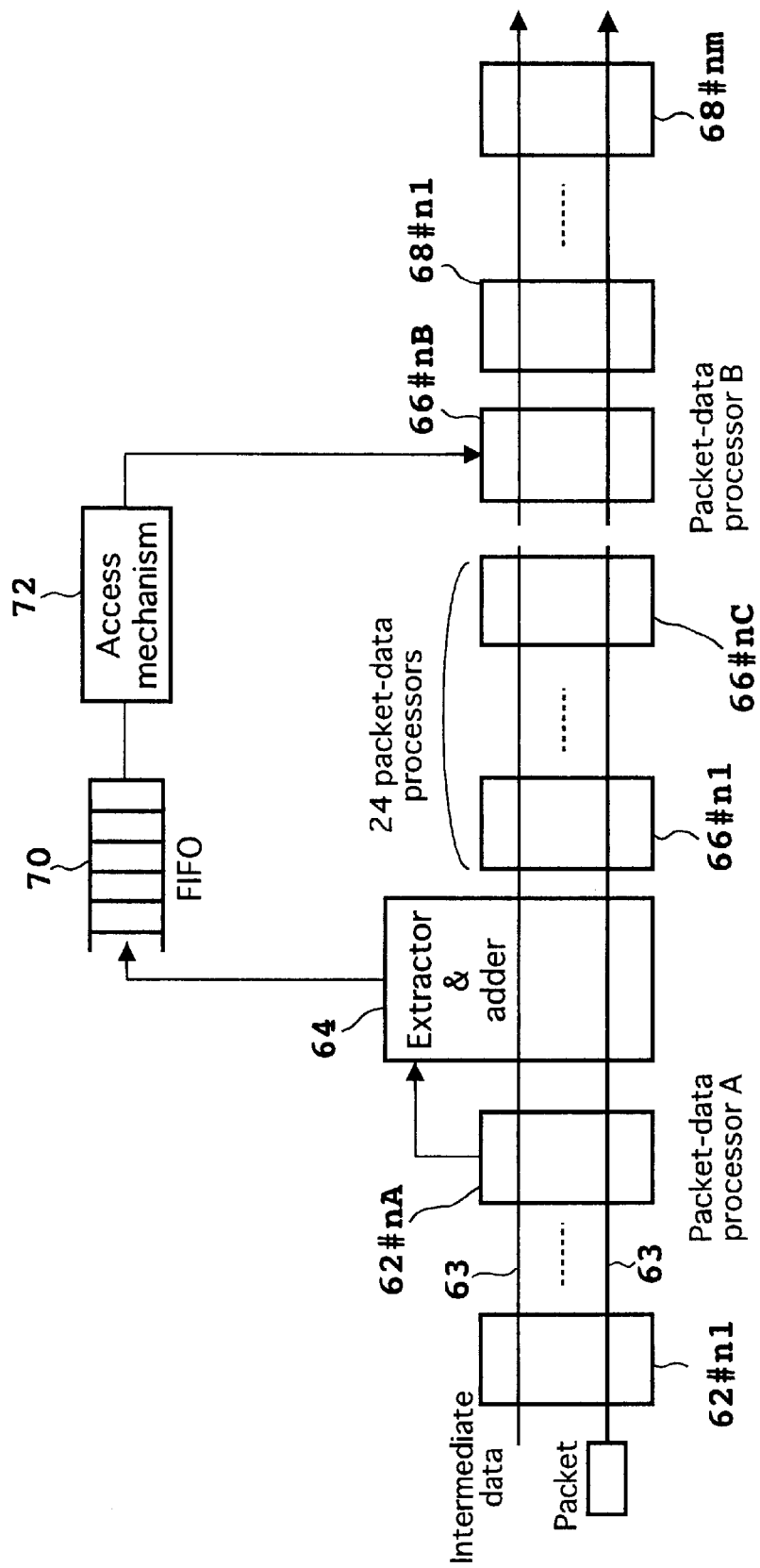
FIG. 11 is a diagram showing the configuration of an L2TP de-capsulating process unit employed in the LNS shown in FIG. 3.

FIG. 11 is a diagram showing the configuration of the L2TP de-capsulating process unit 48#n employed in the reception IF unit 42#n of the LNS shown in FIG. 3. Elements of FIG. 11 identical with those shown in FIG. 6 are denoted by the same reference numerals as the latter. The L2TP de-capsulating process unit 48#n has the following functions:

(1) Form a judgment as to whether or not an L2TP de-capsulating process is required by referring to a flag included in an input packet and store the flag indicating whether or not the process is required in the intermediate-data register 82. For example, if the IP address of a transmission destination of a packet received from the Internet 34 is the address of the apparatus employing the L2TP de-capsulating process unit 48#n and the packet is an L2TP packet, an L2TP capsulating process is deemed necessary. A detailed procedure to form the judgment is described as follows:

1. If the IP address of a transmission destination of a packet is the address of the apparatus employing the L2TP de-capsulating process unit 48#n, form a judgment as to whether or not an upper level protocol indicated by a field in the IP header is the UDP.

2. If the upper level protocol is the UDP, form a judgment as to whether or not a destination port number included in the UDP header is an L2TP port number.

(2) Form a judgment as to whether or not an L2TP de-capsulating process is required by referring to a flag indicating whether or not the process is required. The flag is stored in the intermediate-data register 82. If an L2TP de-capsulating process is required, execute functions (3) to (7) described below. If no L2TP de-capsulating process is required, on the other hand, execute function (7), skipping functions (3) to (6).

(3) Compute a one's-complement sum of the UDP header, the UDP data and the pseudo header of the L2TP packet received from the Internet 34.

(4) Form a judgment as to whether or not the one's-complement sum computed by function (3) is equal to a value set in the UDP checksum field.

(5) If the one's-complement sum computed by function (3) is not equal to the value set in the UDP checksum field, discard the packet.

(6) If the one's-complement sum computed by function (3) is equal to the value set in the UDP checksum field, on the other hand, carry out a de-capsulating process on the packet.

(7) Generate routing information.

The extractor & adder 64 and the packet-data intermediate-processors 66#nj where j=1, . . . , C and B execute function (3), which is virtually the same as a function executed by the L2TP capsulating process unit 48#1. As pre-processing of function (3), the packet-data pre-processor 62#nj (j=1, . . . , A) each save a value stored in the UDP checksum field of the packet in the intermediate-data register 82 and fill up the UDP checksum field with 0s in addition to processing carried out by the packet-data pre-processor 62#1A, that is, the processing to compute the processing count.

In execution of function (4), the packet-data intermediate-processor 66#nC does not store a result of checksum computation in the checksum field of the UDP header. Instead, the result of checksum computation is compared with the value of the checksum field in the UDP header stored in the intermediate-data register 82 to form a judgment as to whether or not they match each other. Then, a flag indicating whether or not the checksum of the UDP header is correct is stored in the intermediate-data register 82. The packet-data post-processors 68#nj where j=1 to m execute functions (5), (6) and (7).

The switch fabric 50 shown in FIG. 3 outputs a packet completing the L2TP capsulating process or the L2TP de-capsulating process to the transmission IF units 52#i where i=1 to n of output routes indicated by the address of a transmission destination included in the packet on the basis of routing information received from the reception IF units 42#i respectively where i=1 to n. The transmission IF units 52#i where i=1 to n transmit the packet from the switch fabric 50 to transmission lines by way of the transmission interface unit 54#i in accordance with a physical interface. It should be noted that, while this embodiment adopts a configuration in which the reception IF units 42#i where i=1 to n carry out processing related to calculation of a UDP checksum, the transmission IF units 52#i where i=1 to n are also capable of carrying out the processing. It is also possible to carry out the L2TP capsulating process from the PPP section at the LAC 32 employed in the VPN network shown in FIG. 2 to the L2TP and the de-L2TP capsulating process from the L2TP to the PPP section in the same configuration as the ones shown in FIGS. 6 and 10. In addition, the present invention can also be applied to another packet-data-processing apparatus for processing packet data with a variable length.

The operation of the LNS 36 shown in FIG. 3 is explained as follows.

(1) L2TP Capsulating Process of Packets

The reception interface unit 44#1 of the LNS 36 receives a packet with the format shown in FIG. 5 from the private network 38 shown in FIG. 2. The reception interface unit 44#1 receives the packet from a transmission line in accordance with a physical interface. The pre-processing unit 46#1 converts the packet from serial data into parallel data and detects a packet header besides other processing. The packet is stored into the packet access register 80 while a flag indicating the packet header and other information are stored in the intermediate-data register 82.

FIG. 12 shows a sequence chart of the L2TP capsulating process unit shown in FIG. 6. If the IP address of a transmission destination included in a packet received from the private network 38 is an IP address cataloged in a table as an address requiring an L2TP capsulating process, for example, the packet-data pre-processor 62#11 at a stage preceding the packet-data pre-processor 62#1A determines that the packet be put in an L2TP capsulating process. A flag indicating whether or not an L2TP capsulating process is required is stored in the intermediate-data register 82. If the packet requires an L2TP capsulating process, a PPP header, a UDP header and an IP header are added as shown in FIGS. 5 and 12 and the packet is stored in the packet access register 80. At that time, the checksum field of the added UDP header is filled up with 0s.

The arrival of the head of a packet activates the packet-data pre-processor 62#1A to carry out processing in accordance with instruction code in the packet-data pre-processor 62#1A. A first instruction procedure is executed to acquire the length of UDP data from the length field of the UDP header added to the packet. Expressed in terms of bytes, the length of UDP data is a sum of the length of the UDP header and the length of a UDP data portion. Then, the length of the packet is found as a sum of the length of UDP data, the length of the Ethernet header and the length of the IP header. A next instruction is executed to divide the length of the packet by 4 by shifting the length to the right by 2 bits. In a next instruction procedure, 1 is added to a result of shifting if a carry has been generated in the preceding division instruction. The result is stored in the extractor & adder register AR as shown by (1) in FIG. 12. Knowing that the beginning of the packet has been supplied as evidenced by a flag indicating the beginning of the packet stored in the intermediate-data register 82, the extractor & adder 64 carries out the following processing. First of all, the extractor & adder 64 acquires (a processing count+9) from AR register of the packet-data pre-processor 62#1A and sets the sum of the processing count and 9 in the counter 96. Then, during the first 9 clocks following the reception of the packet, nothing is done except that the control unit 94 decrements the contents of the counter 96 by 1 for each clock. Addition is started at the 10th clock when the first 16 bits of the UDP header shown in FIG. 9 is input.

The extractor & adder 64 finds a one's-complement sum of 32-bit data. In the first addition, 0 is added to 32-bit data of the packet and the result is stored in an addition-result storage register 104. In the subsequent additions, subsequent 32-bit data of the packet is added to the contents of the addition-result register 104 and the result is stored in the addition-result storage register 104. The control unit 94 decrements the contents of the counter 96 by 1 each time an addition is carried out till the contents become equal to 0. Thus, when the contents of the counter 96 become equal to 1, the extractor & adder 64 performs the last addition. Control is executed to store the result of the last addition at the tail of the FIFO buffer 70 as shown by (2) in FIG. 12.

Knowing that the beginning of the packet has been supplied as evidenced by a flag indicating the beginning of the packet stored in the intermediate-data register 82, the packet-data intermediate-processor 66#1C carries out the following processing. First of all, the packet-data intermediate-processor 66#1C reads out values set in the pseudo header shown in FIG. 10 and packet data stored in the first 16 bits of the UDP header from the packet access register 80. Then, the packet-data intermediate-processor 66#1C finds a 16-bit one's-complement sum of the 16-bit values set in the pseudo header and 16-bit packet data stored in the UDP header, storing the sum in the intermediate-data register 82 as shown by (3) in FIG. 12. The result is transmitted synchronously with the packet.

Knowing that the UDP header of the packet has been supplied as evidenced by a flag indicating the beginning of the packet stored in the intermediate-data register 82, the packet-data intermediate-processor 66#1B carries out the following processing in accordance with instruction code stored in the packet-data intermediate-processor 66#1B. In a first instruction procedure, the packet-data intermediate-processor 66#1B executes an instruction requesting the access mechanism unit 72 to fetch a result of computation from the FIFO buffer 70. In accordance with the instruction executed by the packet-data intermediate-processor 66#1B, the access mechanism unit 72 controls the FIFO buffer 70 to output a result of computation at the head of the FIFO buffer 70. The access mechanism unit 72 then shifts each of the remaining results of computation to the head of the FIFO buffer 70 by a slot required for storing one result. As described above, the extractor & adder 64 completes the processing of the input packet and stores a result of computation into the FIFO buffer 70. Thus, the result of computation read out from the FIFO buffer 70 is a result of processing the packet. In the next instruction procedure, the packet-data intermediate-processor 66#1B finds a 16-bit one's-complement sum of the 16 most significant bits and the 16 least significant bits of the result of computation output by the extractor & adder 64 to the FIFO buffer 70 and read out by the access mechanism unit 72 from the FIFO buffer 70.

In the next instruction procedure, the packet-data intermediate-processor 66#1B reads out the 16-bit one's-complement sum of the first 16 bits of the pseudo header and the first 16 bits of the UDP header from the intermediate-data register 82. The 16-bit one's-complement sum was found earlier by the packet-data intermediate-processor 66#1C. Then, the packet-data intermediate-processor 66#1B finds a one's-complement sum of the 16-bit one's-complement sum read out from the intermediate-data register 82 and the result found by the preceding instruction. The operations described above result in a 16-bit one's-complement sum, which is data required in finding a UDP checksum. In the next instruction procedure, a one's-complement sum of these values is found as an eventual UDP checksum, which is then stored in the checksum field as shown by (4) in FIG. 12. The processing to store the checksum of the UDP header calculated by the procedures described above in the UDP header can be carried out by using the pipeline technique.

Later on, the packet is subjected to a process carried out by the packet-data post-processors 68#1j where j=1 to m to detect routing information before being passed on to the switch fabric 50. The switch fabric 50 carries out routing on the packet in accordance with the routing information and then supplies the packet to a transmission IF unit 52#i for the route, for example, the transmission IF unit 52#n. The transmission interface unit 54#n then outputs the packet to a transmission line. The packet completing the L2TP capsulating process is relayed to a packet-relaying apparatus indicated by the IP address specified in the packet by way of the Internet 34. The packet-relaying apparatus supporting the L2TP receives the packet, carries out a L2TP de-capsulating process on the packet and transmits the packet to a destination such as a terminal.

(2) L2TP De-capsulating Process of Packets

The reception interface unit 44#n employed in the LNS 36 is a unit for receiving a packet with the format shown in FIG. 5 from the Internet 34 shown in FIG. 2. The reception interface unit 44#n receives the packet from a transmission line of the Internet 34 in accordance with a physical interface. The pre-processing unit 46#n carries out processing on the received packet such as serial-to-parallel conversion and detection of a packet header. The packet is stored in the packet access register 80 whereas information such as a flag indicating the packet header is stored in the intermediate-data register 82. The packet-data pre-processor 62#n1 saves the UDP checksum field in the intermediate-data register 82 and then clears it to 0. Processing carried out by the packet-data pre-processor 62#nA, the extractor & adder 64 and the packet-data intermediate-processor 66#nC is the same as the L2TP capsulating process. The packet-data intermediate-processor 66#nB carries out the same processing as the packet-data intermediate-processor 66#1B to compute a UDP checksum. The computed UDP checksum is compared with the UDP checksum field saved in the intermediate-data register 82 to determine whether or not the former matches the latter. If they do not match each other, the packet is discarded. If they match each other, on the other hand, the packet is supplied to the packet-data post-processors 68#1j where j=1 to m for deleting the PPP header, the UDP header and the IP header. Then, routing information is detected before the packet is passed on to the switch fabric 50. The switch fabric 50 carries out routing on the packet in accordance with the routing information and then supplies the packet to a transmission IF unit 52#i for the route, for example, the transmission IF unit 52#1. The transmission interface unit 54#1 then outputs the packet to the private network 38.

As described above, in accordance with this embodiment, a FIFO buffer is provided also in the case of processing of data with a variable length such as calculation of a UDP checksum so as to allow processing to be carried out in a pipeline configuration. As a result, the packet processing can be carried out at a high speed. In the configuration described above, a fixed number of packet-data processors, to be more specific, 24 packet-data processors, are provided between a packet-data processor supposed to supply data of a packet to the extractor & adder storing a result of computation in the FIFO buffer and a packet-data processor supposed to fetch a result of computation for the packet from the FIFO buffer. While a packet is passing through the 24 packet-data processors, a result of computation for the packet is shifted from a stage to another through the FIFO buffer where a stage is a slot in the FIFO buffer for storing a result of computation. Thus, 24 stages are provided in the FIFO buffer so that, when a packet is supplied to the packet-data processor supposed to fetch a result of computation for a packet from the FIFO buffer, the processor correctly fetches a result of computation for the incoming packet. Note that it is also possible to provide a configuration in which a packet-data preprocessor 62#iA supposed to supply data of a packet to the extractor & adder and a packet-data post-processor 68#iB supposed to fetch a result of computation for the packet from the FIFO buffer are properly selected among the packet-data processors at a startup of the apparatus employing the processors so that the number of packet-data processors between the packet-data pre-processor 62#iA and the packet-data post-processor 68#iB matches the number of stages in the FIFO buffer FIFO buffer 70. In addition, while an extractor & adder is employed in the configuration described above, it is also possible to provide a configuration, which employs a processor for computing a processing count as a result of processing dependent on the packet length besides the extractor & adder.

Second Embodiment

Figure 13:
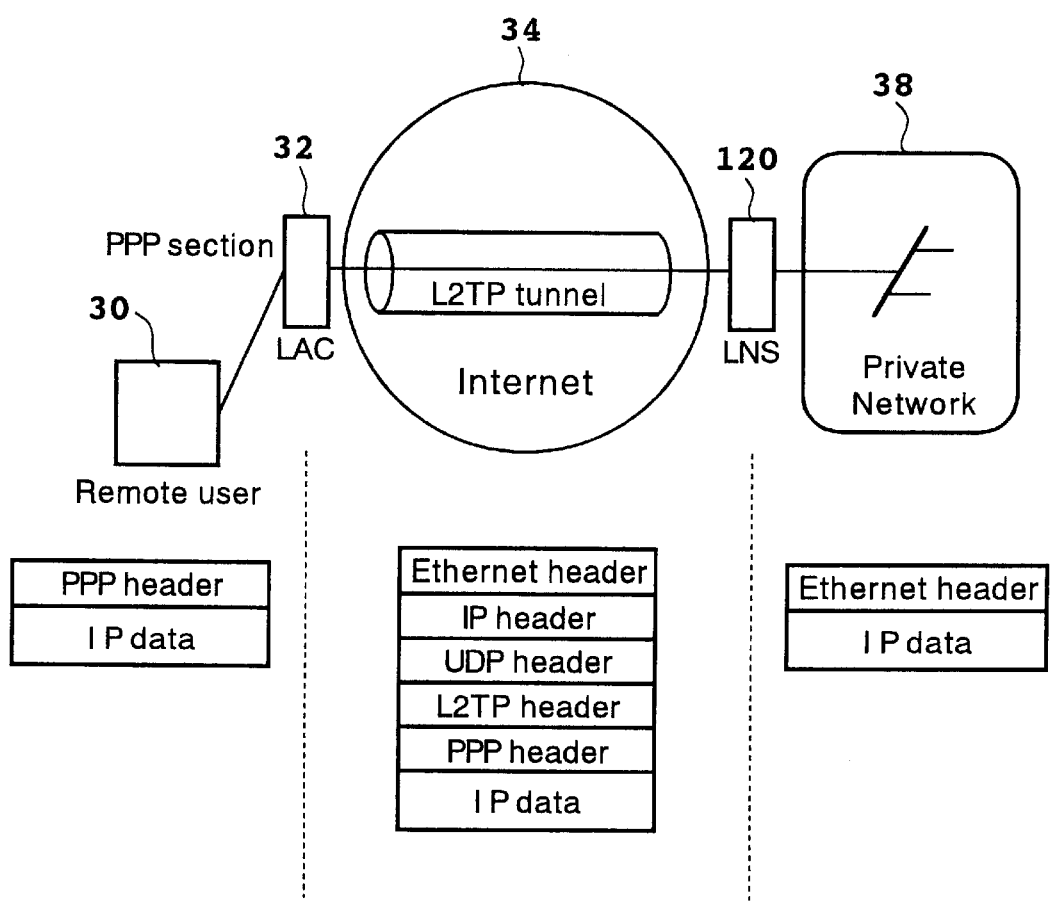
FIG. 13 is a diagram showing the configuration of a VPN network implemented by a second embodiment of the present invention.
Figure 14:
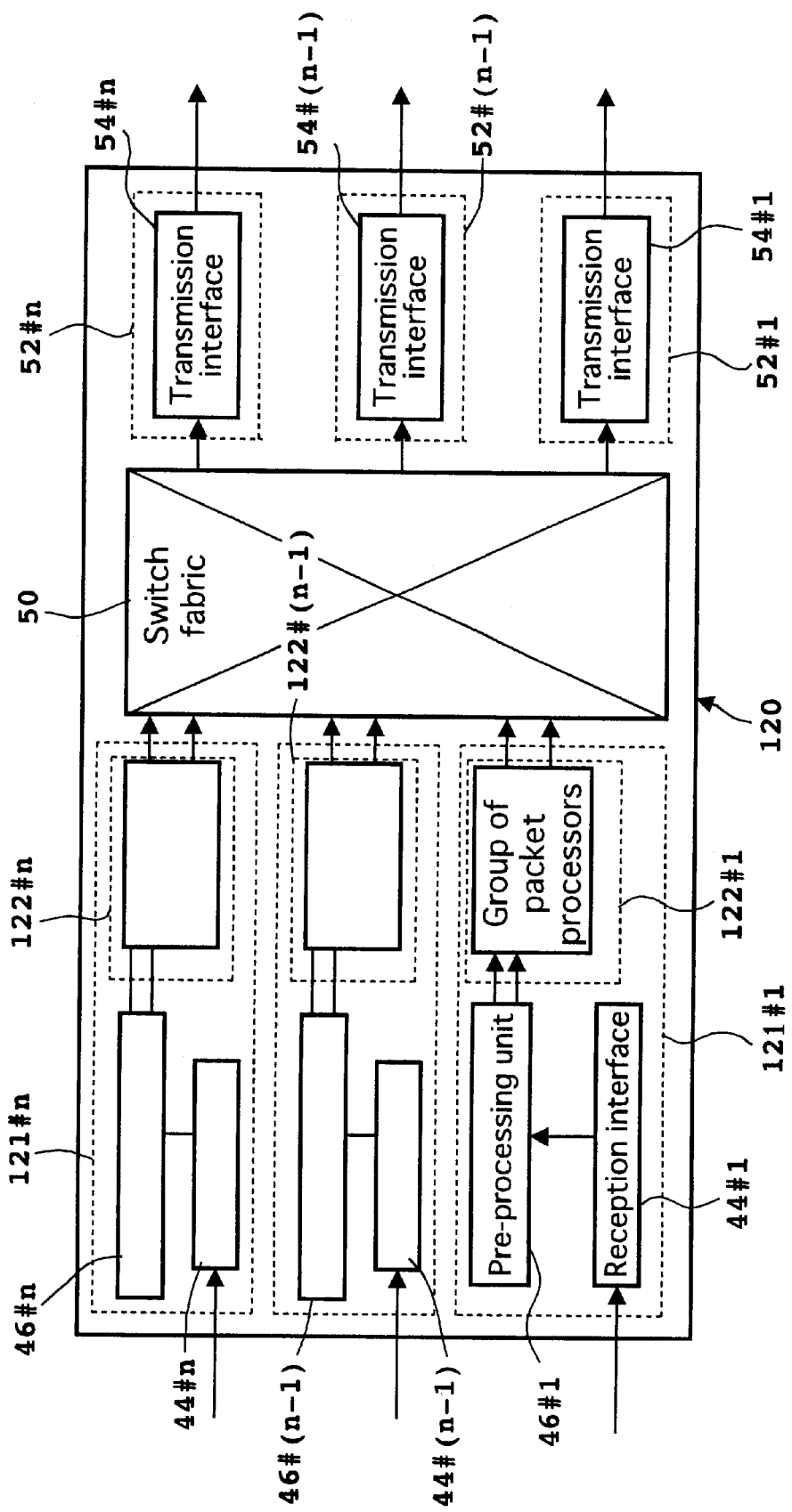
FIG. 14 is a diagram showing the configuration of an LNS employed in the VPN network shown in FIG. 13.
Figure 15:
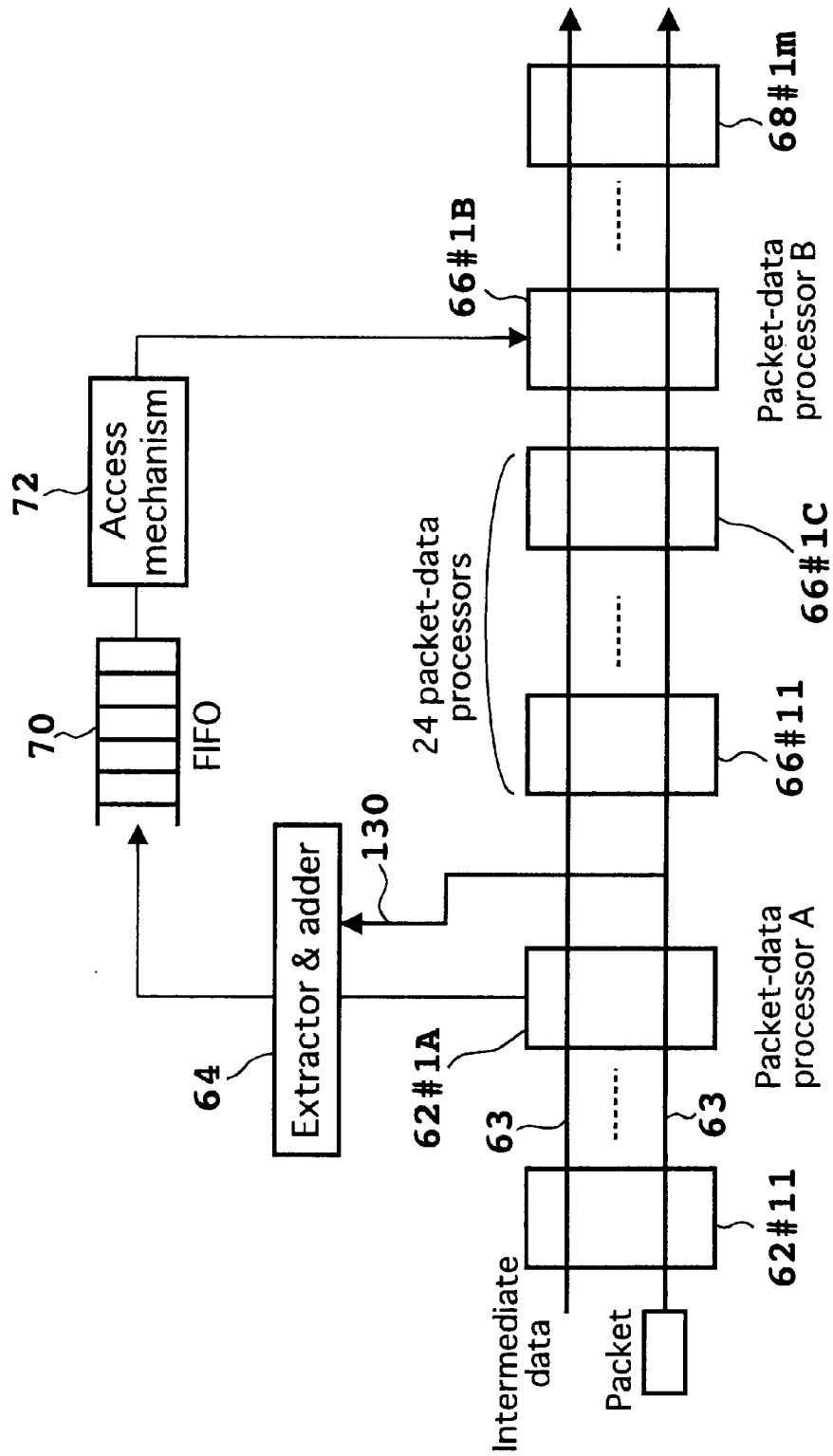
FIG. 15 is a diagram showing the configuration of an L2TP capsulating process unit employed in the LNS shown in FIG. 14.

FIG. 13 is a diagram showing the configuration of a VPN network adopting the L2TP protocol as implemented by a second embodiment of the present invention and a packet format adopted therein. Elements of FIG. 13 identical with those shown in FIG. 2 are denoted by the same reference numerals as the latter. FIG. 14 is a diagram showing the configuration of an LNS 120 employed in the VPN network shown in FIG. 13. Elements of FIG. 13 identical with those shown in FIG. 3 are denoted by the same reference numerals as the latter. FIG. 15 is a diagram showing the configuration of an L2TP capsulating process unit 122#1 employed in the LNS shown in FIG. 13. Elements of FIG. 13 identical with those shown in FIG. 6 are denoted by the same reference numerals as the latter. As shown in FIG. 15, the L2TP capsulating process unit 122#1 does not have a configuration in which the extractor & adder 64 is provided on a pipeline comprising the packet-data pre-processors 62#1j where j=1, . . . , A and the packet-data intermediate-processors 66#1j where j=1, . . . , C and B. Instead, the L2TP capsulating process unit 122#1 has a configuration in which the extractor & adder 64 is separated from a pipeline comprising the packet-data pre-processors 62#1j where j=1, . . . , A and the packet-data intermediate-processors 66#1j where j=1, . . . , C and B by another path. To put it in detail, the extractor & adder 64 is connected in parallel to the packet-data intermediate-processors 66#1j where j=1, . . . , C and B and the packet-data post-processors 68#1j where j=1 to m.

FIG. 16 is a diagram showing the configuration of an extractor & adder extractor & adder 64 employed in the capsulating process unit L2TP capsulating process unit 122#1 shown in FIG. 15. Elements of FIG. 16 identical with those shown in FIG. 8 are denoted by the same reference numerals as the latter. As shown in FIG. 16, a bus 130 is connected to input sides of registers 90 and 92 employed in the extractor & adder 64. The bus 130 is connected to the output side of a packet access register 80 employed in the packet-data pre-processor 62#1A. However, the output sides of the register 90 and the register 92 are not connected to the input side of the packet access register 80 employed in the packet-data intermediate-processor 66#11. By separating the extractor & adder 64 from the data path of a pipeline comprising the packet-data pre-processors 62#ij where j=1, . . . , A, the packet-data intermediate-processors 66#1j where j=1, . . . , C and B and the packet-data post-processors 68#1j where j=1 to m by the other path 130 as described above, the configuration has a demerit of necessity to provide the separate bus 130. However, the configuration offers a merit of a high packet-processing speed due to the fact that a packet delay is no longer needed in the register 92 employed in the extractor & adder 64 and a merit of easy manufacturing due to the fact that the pipeline comprises only packet-data processors of the same type. Since the register 92 is a single-stage register, the number of packet-data intermediate-processors 66#1j where j=1, . . . , C is 24, which is the same as the first embodiment. The operation of the L2TP capsulating process unit 122#1 is the same as that of the L2TP capsulating process unit 48#1.

FIG. 17 is a diagram showing the configuration of an L2TP de-capsulating process unit 122#n employed in the LNS shown in FIG. 14. Elements of FIG. 17 identical with those shown in FIG. 11 are denoted by the same reference numerals as the latter. As shown in FIG. 17, the L2TP de-capsulating process unit 122#n does not have a configuration in which the extractor & adder 64 is provided on a pipeline comprising the packet-data pre-processors 62#nj where j=1, . . . , A and the packet-data intermediate-processors 66#nj where j=1, . . . , C and B. Instead, the L2TP de-capsulating process unit 122#n has a configuration in which the extractor & adder 64 is separated from a pipeline comprising the packet-data pre-processors 62#nj where j=1, . . . , A and the packet-data intermediate-processors 66#nj where j=1, . . . , C and B by another path. To put it in detail, the extractor & adder 64 is connected in parallel to the packet-data intermediate-processors 66#nj where j=1, . . . , C and B and the packet-data post-processors 68#nj where j=1 to m. Thus, the configuration of the L2TP de-capsulating process unit 122#n is the same as that of the L2TP capsulating process unit 122#1.

As described above, the second embodiment exhibits the same effects as the first one. Also as explained above, in accordance with the present invention, by adoption of a technique to connect a memory in parallel to a plurality of packet-data processors, it is possible to fetch data with a timing different from packet to packet to be used in a data-processing unit provided at a later stage without reducing the high speed of packet processing characterizing the technique of processing packet data as is the case with the processing of checksums of the UDP and TCP headers.

It should be noted that the present invention is not limited to the details of the preferred embodiments described above. Instead, the scope of the present invention is defined only by appended claims, and all changes and modifications falling within the scope of the claims are therefore to be embraced by the invention.

What is claimed is:

1. A packet-data-processing apparatus for processing data of an input packet, said packet-data-processing apparatus comprising:

a first data-processing unit for computing information on a processing count based on the length of said input packet and outputting said information;

a memory;

a second data-processing unit for carrying out processing on pieces of data included in said input packet sequentially in accordance with said information on a processing count and storing a first result of processing at the end of said processing carried out on each of said pieces of data in said memory;

an access control unit for reading out one of said first results of processing written into said memory least recently from said memory at a request for a read operation and deleting said first result of processing read out from said memory from said memory;

a third data-processing unit for making said request for a read operation at reception of data at a predetermined position of said input packet by said third data-processing unit and carrying out processing based on said received input packet and said first result of processing read out by said access mechanism unit at said request; and a fourth data-processing unit constituting pipeline data-processing mechanism with said first and third data-processing unit and having latency longer than latency which said second data-processing unit needs to store said first result of processing for said packet with a greatest packet length packet into said memory, wherein said memory provides a sufficient storage area for storing a first result of processing for an input packet having the longest latency since the first result of processing is generated till the first result of processing is supplied to said third data-processing unit.

2. A packet-data-processing apparatus according to claim 1 wherein:

said apparatus further includes a fifth data-processing unit for carrying processing based on packet data set in a fixed-length field of an input packet and outputting a second result of processing; and said third data-processing unit carries out processing based on said first results of processing, said second result of processing and said input packet.

3. A packet-data-processing apparatus according to claim 2 wherein:

a first set of shift registers connected to each other in cascade is provided for each of said second to fifth data-processing units; and said second to fifth data-processing units each carry out processing based on said packet stored in said respective set of shift registers.

4. A packet-data-processing apparatus according to claim 2 wherein:

a set of shift registers connected to each other in cascade is provided for each of said third to fifth data-processing units;

said second data-processing unit is provided in parallel to said set of shift registers; and said third and fifth data-processing units each carry out processing based on said packet stored in said respective set of shift registers.

5. A packet-data-processing apparatus according to claim 3, said apparatus further including a second set of shift registers each for storing intermediate data related to said packet wherein said second set of shift registers is provided in parallel to said first set of shift registers.

* * * * *